United States Patent
Morita et al.

(10) Patent No.: US 9,910,426 B2
(45) Date of Patent: Mar. 6, 2018

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Minamitsuru-gun, Yamanashi (JP)

(72) Inventors: Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 186 days.

(21) Appl. No.: 15/083,552

(22) Filed: Mar. 29, 2016

(65) Prior Publication Data

US 2016/0291580 A1    Oct. 6, 2016

(30) Foreign Application Priority Data

Mar. 30, 2015    (JP) ................................. 2015-070234

(51) Int. Cl.
G06F 19/00    (2011.01)
G05B 19/416    (2006.01)
B23Q 15/007    (2006.01)

(52) U.S. Cl.
CPC ......... *G05B 19/416* (2013.01); *B23Q 15/007* (2013.01); *G05B 2219/49108* (2013.01); *G05B 2219/50216* (2013.01)

(58) Field of Classification Search
CPC ........ G05B 19/416; G05B 2219/49108; G05B 2219/50216; B23Q 15/007
See application file for complete search history.

(56) References Cited

U.S. PATENT DOCUMENTS 7,299,108 B2    11/2007    Geissdorfer et al.
7,450,127 B2    11/2008    Hong et al.
(Continued)

FOREIGN PATENT DOCUMENTS

CN    1791846 A    6/2006
CN    101180591 A    5/2008
(Continued)

OTHER PUBLICATIONS

Chinese Office Action for Chinese Application No. 201610186925.9 dated May 9, 2017, 12 pages.
(Continued)

*Primary Examiner* — Jason Lin
*Assistant Examiner* — Brian T McMenemy
(74) *Attorney, Agent, or Firm* — RatnerPrestia

(57) ABSTRACT

A controller for controlling a synchronized operation of spindle and feed axes. A spindle-axis control section includes a section for making a spindle axis perform an accelerated rotation at maximum capacity from a process start position; sections for respectively detecting a maximum acceleration, a residual rotation amount and a current speed of the spindle axis; a section for making the spindle axis perform a decelerated rotation at maximum capacity to reach a target thread depth after the accelerated rotation; and a section for executing a torque-limiting during the accelerated rotation of the spindle axis, in such a manner that a torque command lower than a maximum torque command is given to the spindle axis at a start of acceleration, and thereafter the torque command is gradually increased so that the maximum torque command is given to the spindle axis when a predetermined time has elapsed.

15 Claims, 12 Drawing Sheets

(56) References Cited

U.S. PATENT DOCUMENTS

| | | | | |
|---|---|---|---|---|
| 2006/0287758 A1* | 12/2006 | Geissdorfer | ........... | G05B 19/41 700/186 |
| 2007/0046677 A1* | 3/2007 | Hong | ..................... | G05B 19/41 345/442 |
| 2013/0300337 A1* | 11/2013 | Nagaoka | .............. | G05B 19/416 318/671 |
| 2015/0081084 A1* | 3/2015 | Nishiwaki | ................ | B23G 1/16 700/170 |

FOREIGN PATENT DOCUMENTS

| | | |
|---|---|---|
| JP | 2629729 B | 7/1997 |
| JP | 11156672 | 6/1999 |
| JP | 2003181722 | 7/2003 |
| JP | 2004141991 A | 5/2004 |
| JP | 3553741 B | 8/2004 |
| JP | 2006528813 | 12/2006 |
| JP | 04014485 | 11/2007 |
| JP | 2010511919 | 4/2010 |

OTHER PUBLICATIONS

Japanese Office Action dated Jul. 14, 2016 for Japanese Application No. 2015-070234, 2 pages.

* cited by examiner

DEVICE AND METHOD OF CONTROLLING MACHINE TOOL, TO CONTROL SYNCHRONIZED OPERATION OF SPINDLE AXIS AND FEED AXIS

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. On the other hand, Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the power characteristics of the spindle axis, and controls the spindle axis based on the acceleration and deceleration command to improve the response of the spindle axis, so as to reduce cycle time.

SUMMARY OF THE INVENTION

In a machine tool capable of performing a tapping process by a synchronized operation of a spindle axis and a feed axis, cycle time is generally determined depending on the acceleration capacity of the spindle axis. It is desirable to reduce cycle time by controlling the spindle axis so as to maximize the acceleration capacity thereof with a simple configuration, without performing a preliminary work requiring a high-level skill, such as a parameter setting or adjustment, etc., required for the numerical control unit to prepare acceleration and deceleration commands in conformity with the power characteristics of the spindle axis. It is also desirable, for the acceleration and deceleration control of the spindle axis, to reduce a mechanical or structural shock that may be caused on the spindle axis due to the rapid change in acceleration at the start of acceleration or the time of stoppage, and to reduce a synchronization error that may be caused between the spindle axis and the feed axis due to the rapid change in acceleration at the start of acceleration or the time of stoppage.

One aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position of the spindle axis. The numerical control section comprises a spindle-axis command outputting section configured to obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section. The spindle-axis control section comprises an initial-motion control section configured to make the spindle axis perform an accelerated rotation at maximum capacity, from the process start position toward the target thread depth, with the maximum rotation speed set as a target value; a torque-limit executing section configured to execute a torque-limiting for the initial-motion control section during a period when the initial-motion control section makes the spindle axis perform the accelerated rotation, in such a manner that, at a start of acceleration, a predetermined torque command lower than a maximum torque command provided for the accelerated rotation at maximum capacity is given to the spindle axis, and during a predetermined time elapsing from the start of acceleration, the predetermined torque command is gradually increased so that the maximum torque command is given to the spindle axis at an instant when the predetermined time has elapsed; a maximum-acceleration detecting section configured to detect a maximum acceleration of the spindle axis during the accelerated rotation at maximum capacity, based on the rotational position of the spindle axis; a residual rotation-amount detecting section configured to detect a residual rotation amount of the spindle axis during a period when the spindle axis operates from a current position to the target thread depth, based on the total rotation amount and the rotational position of the spindle axis; a current-speed detecting section configured to detect a current speed of the spindle axis based on the rotational position of the spindle axis; and a positioning-motion control section configured to make the spindle axis perform a decelerated rotation at maximum capacity so as to reach the target thread depth, after the accelerated rotation at maximum capacity, based on the maximum acceleration, the residual rotation amount and the current speed.

Another aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position. The numerical control section comprises a spindle-axis command outputting section configured to obtain, from the tapping program, a total return-rotation amount and a maximum return-rotation speed of the spindle axis during a period when the spindle axis operates from a target thread depth to a return completion position, and to send the total return-rotation amount and the maximum return-rotation speed as the spindle-axis command to the spindle-axis control section. The spindle-axis control section comprises an initial-motion control section configured to make the spindle axis perform an accelerated inverse rotation at maximum capacity, from the target thread depth, or from an initial return position at which the spindle axis has returned by a predetermined rotation number from the target thread depth, toward the return completion position, with the maximum return-rotation speed set as a target value; a maximum-acceleration detecting section configured to obtain a maximum acceleration of inverse rotation during a period when the spindle axis performs the accelerated inverse rotation from the target thread depth; a residual rotation-amount detecting section configured to detect a residual return-rotation amount of the spindle axis during a period when the spindle axis operates from a current position to the return completion position, based on the total return-rotation amount and the rotational position; a current-speed detecting section configured to detect a current speed of inverse rotation of the spindle axis based on the rotational position; and a positioning-motion control section configured to make the spindle axis perform a decelerated inverse rotation at an acceleration lower than the maximum acceleration of inverse rotation and changing at a predetermined rate during a predetermined acceleration-change time, and also perform a decelerated inverse rotation at maximum capacity during a time except for the acceleration-change time, so as to make the spindle axis stop at the return completion position, after the accelerated inverse rotation at maximum capacity, based on the maximum acceleration of inverse rotation, the residual return-rotation amount, the current speed of inverse rotation and the acceleration-change time.

A further aspect of the invention provides a method of controlling a machine tool, configured to control a synchronized operation of a spindle axis and a feed axis, the method comprising the acts, executed by a controller, of obtaining, from a tapping program, a total rotation amount and a maximum rotation speed of the spindle axis during a period when the spindle axis operates from a process start position to a target thread depth; making the spindle axis perform an accelerated rotation at maximum capacity, from the process start position toward the target thread depth, with the maximum rotation speed set as a target value, while executing a torque-limiting in such a manner that, at a start of acceleration, a predetermined torque command lower than a maximum torque command provided for the accelerated rotation at maximum capacity is given to the spindle axis, and during a predetermined time elapsing from the start of acceleration, the predetermined torque command is gradually increased so that the maximum torque command is given to the spindle axis at an instant when the predetermined time has elapsed; detecting a maximum acceleration during the accelerated rotation at maximum capacity, based on a rotational position feedback of the spindle axis; detecting a residual rotation amount of the spindle axis during a period when the spindle axis operates from a current position to the target thread depth, based on the total rotation amount and the rotational position feedback; detecting a current speed of the spindle axis based on the rotational position feedback; and making the spindle axis perform a decelerated rotation at maximum capacity so as to reach the target thread depth, after the accelerated rotation at maximum capacity, based on the maximum acceleration, the residual rotation amount and the current speed.

An yet further aspect of the invention provides a method of controlling a machine tool, configured to control a synchronized operation of a spindle axis and a feed axis, the method comprising the acts, executed by a controller, of obtaining, from a tapping program, a total return-rotation amount and a maximum return-rotation speed of the spindle axis during a period when the spindle axis operates from a target thread depth to a return completion position; making the spindle axis perform an accelerated inverse rotation at maximum capacity, from the target thread depth, or from an initial return position at which the spindle axis has returned by a predetermined rotation number from the target thread depth, toward the return completion position, with the maximum return-rotation speed set as a target value; obtaining a maximum acceleration of inverse rotation during a period when the spindle axis performs the accelerated inverse rotation from the target thread depth; detecting a residual return-rotation amount of the spindle axis during a period when the spindle axis operates from a current position to the return completion position, based on the total return-rotation amount and a rotational position feedback of the spindle axis; detecting a current speed of inverse rotation of the spindle axis based on the rotational position feedback; and making the spindle axis perform a decelerated inverse rotation at an acceleration lower than the maximum acceleration of inverse rotation and changing at a predetermined rate during a predetermined acceleration-change time, and also perform a decelerated inverse rotation at maximum capacity during a time except for the acceleration-change time, so as to make the spindle axis stop at the return completion position, after the accelerated inverse rotation at maximum capacity, based on the maximum acceleration of inverse rotation, the residual return-rotation amount, the current speed of inverse rotation and the acceleration-change time.

The controller according to one aspect has a configuration wherein, when the spindle axis is made to perform a cutting motion from the process start position to the target thread depth, the numerical control section instructs only the total rotation amount and the maximum rotation speed, of the spindle axis, as the spindle axis command to the spindle-axis control section, and the spindle-axis control section performs, in accordance with the spindle axis command, the cutting motion by accelerating the spindle axis with a maximum power using a maximum permissible current, aiming at the maximum rotation speed, and continuously performs, based on the maximum acceleration during the accelerating step and the residual rotation amount and current speed of the spindle axis, the cutting motion until the target thread depth in the shortest time while decelerating the spindle axis at the maximum deceleration so as to make the spindle axis reach the target thread depth. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, during the period when the spindle-axis control section makes the spindle axis perform the accelerated rotation at maximum capacity, the torque-limiting is executed in the predetermined time elapsing from the start of acceleration, so that it is possible for the spindle axis to start the rotation thereof at a sufficiently lower (e.g., null) acceleration relative to the maximum acceleration and thereafter gradually increase the acceleration so as to perform the accelerated rotation at the maximum acceleration at the instant when the predetermined time has elapsed. Therefore, according to the present controller, it is possible to prevent the acceleration of the spindle axis from rapidly changing at the start of acceleration, so that it is possible to reduce a mechanical or structural shock that may be caused on the spindle axis due to the change in the acceleration, and also to reduce a synchronization error that may be caused between the spindle axis and the feed axis due to the change in the acceleration.

The controller according to the other aspect has a configuration wherein, when the spindle axis is made to perform a return motion from the target thread depth to the return completion position, the numerical control section instructs only the total return-rotation amount and the maximum return-rotation speed, of the spindle axis, as the spindle axis command to the spindle-axis control section, and the spindle-axis control section performs, in accordance with the spindle axis command, the return motion by accelerating the spindle axis with a maximum power using a maximum permissible current, aiming at the maximum return-rotation speed, and continuously performs, based on the maximum acceleration during the accelerating step and the residual return-rotation amount and current speed of the spindle axis, the return motion until the return completion position in the shortest time while decelerating the spindle axis at the maximum deceleration so as to make the spindle axis stop at the return completion position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller has a configuration wherein, when the spindle axis is made to perform the decelerated inverse rotation at maximum capacity, the position control of the spindle axis is executed in consideration of the acceleration-change time, so that it is possible for the spindle axis to start at a sufficiently lower (e.g., null) deceleration relative to the maximum deceleration and thereafter gradually increase the deceleration so as to perform the decelerated inverse rotation at the maximum deceleration at the instant when the acceleration-change time has elapsed. Therefore, according to the present controller, it is possible to prevent the deceleration of the spindle axis from rapidly changing during the decelerated inverse rotation or at the stoppage at the return completion position, so that it is possible to reduce a mechanical or structural shock that may be caused on the spindle axis due to the change in the deceleration, and also to reduce a synchronization error that may be caused between the spindle axis and the feed axis due to the change in the deceleration.

In the control method according to the further aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
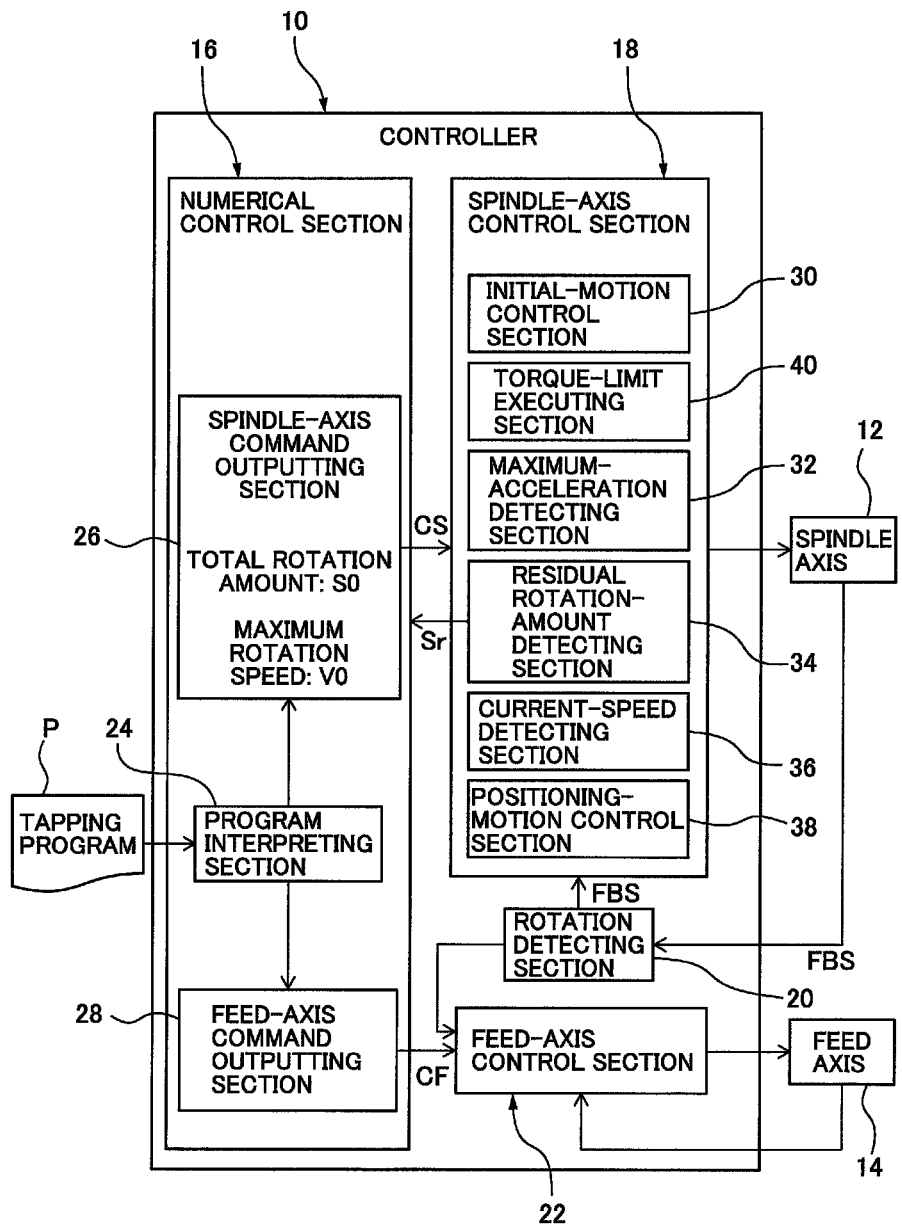
FIG. 1 is a functional block diagram showing a configuration of a first embodiment of a machine tool controller.

Embodiments of the present invention will be described below with reference to the accompanying drawings. Throughout the drawings, corresponding components are denoted by common reference numerals.

FIG. 1 is a functional block diagram showing a configuration of a device of controlling (i.e., a controller 10 of) a machine tool, according to one embodiment. The controller 10 has a configuration for controlling a synchronized operation of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. Though not illustrated, the spindle axis 12 is a control axis provided for a drive unit, such as a spindle motor, that rotates a hold unit for holding a workpiece or a tool at a necessary speed for processing. Though not illustrated, the feed axis 14 is a control axis provided for a drive unit, such as a servo motor, that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that in the present invention the configuration of the machine tool is not particularly limited.

The controller 10 includes a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a process start position (or a rotational position) to a target thread depth (or a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000/min, the total rotation amount S0 of the spindle axis 12, from the process start position to the target thread depth, is calculated as 30÷1.25=24 (rev). Accordingly, the spindle-axis command outputting section 26 notifies the spindle-axis control section 18 of V0=3000 ($min^{-1}$) and S0=24 (rev). In this way, the spindle-axis command CS does not include a position command and/or an acceleration/deceleration command, which makes the spindle axis 12 perform a rotational motion until the target thread depth.

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not shown), such as an encoder, etc., for detecting the operating position of the drive unit of the spindle axis 12.

The spindle-axis control section 18 includes an initial-motion control section 30 configured to make the spindle axis 12 perform an accelerated rotation at maximum capacity, from the process start position toward the target thread depth, with the maximum rotation speed V0 ($min^{-1}$), sent from the spindle-axis command outputting section 26, set as a target value; a maximum-acceleration detecting section 32 configured to detect a maximum acceleration A0 ($min^{-1}/s$) of the spindle axis 12 during the accelerated rotation at maximum capacity, based on the rotational position FBS; a residual rotation-amount detecting section 34 configured to detect a residual rotation amount Sr (rev) of the spindle axis 12 during a period when the spindle axis operates from a current position (or a rotational position) to the target thread depth, based on the total rotation amount S0 (rev), sent from the spindle-axis command outputting section 26, and the rotational position FBS; a current-speed detecting section 36 configured to detect a current speed Vc ($min^{-1}$) of the spindle axis 12 based on the rotational position FBS; and a positioning-motion control section 38 configured to make the spindle axis 12 perform a decelerated rotation at maximum capacity so as to reach the target thread depth, after the accelerated rotation at maximum capacity, based on the maximum acceleration A0, the residual rotation amount Sr and the current speed Vc. The spindle-axis control section 18 further includes a torque-limit executing section 40 configured to execute a torque-limiting for the initial-motion control section 30 during a period when the initial-motion control section 30 makes the spindle axis 12 perform the accelerated rotation, in such a manner that, at a start of acceleration, a predetermined torque command lower than a maximum torque command provided for the accelerated rotation at maximum capacity is given to the spindle axis 12, and during a predetermined time T0 (sec) elapsing from the start of acceleration, the predetermined torque command is gradually increased so that the maximum torque command is given to the spindle axis 12 at an instant when the predetermined time T0 has elapsed.

In one embodiment, the positioning-motion control section 38 may be configured to make the spindle axis 12 reach the target thread depth, after the accelerated rotation at maximum capacity, based on the maximum acceleration A0, the residual rotation amount Sr, the current speed Vc and a predetermined acceleration-change time T1 (sec), by making the spindle axis 12 perform a decelerated rotation at an acceleration lower than the maximum acceleration A0 and changing at a predetermined rate during the acceleration-change time T1, while making the spindle axis 12 perform the decelerated rotation at maximum capacity during a time except for the acceleration-change time T1. The positioning-motion control section 38 may also be configured to execute a position control that makes the spindle axis 12 stop at the target thread depth. Alternatively, the positioning-motion control section 38 may be configured to execute a position control that does not make the spindle axis 12 stop at the target thread depth.

The controller 10 is capable of controlling, in a tapping process using a machine tool, a motion of the spindle axis 12 for cutting a pilot hole of a workpiece with a tool until a target thread depth (referred to as a cutting motion, in this application). Also, the controller 10 is capable of controlling, in a tapping process using a machine tool, a motion of the spindle axis 12 for pulling out a tool from a workpiece after cutting a pilot hole of the workpiece until a target thread depth (referred to as a return motion, in this application).

Figure 2:
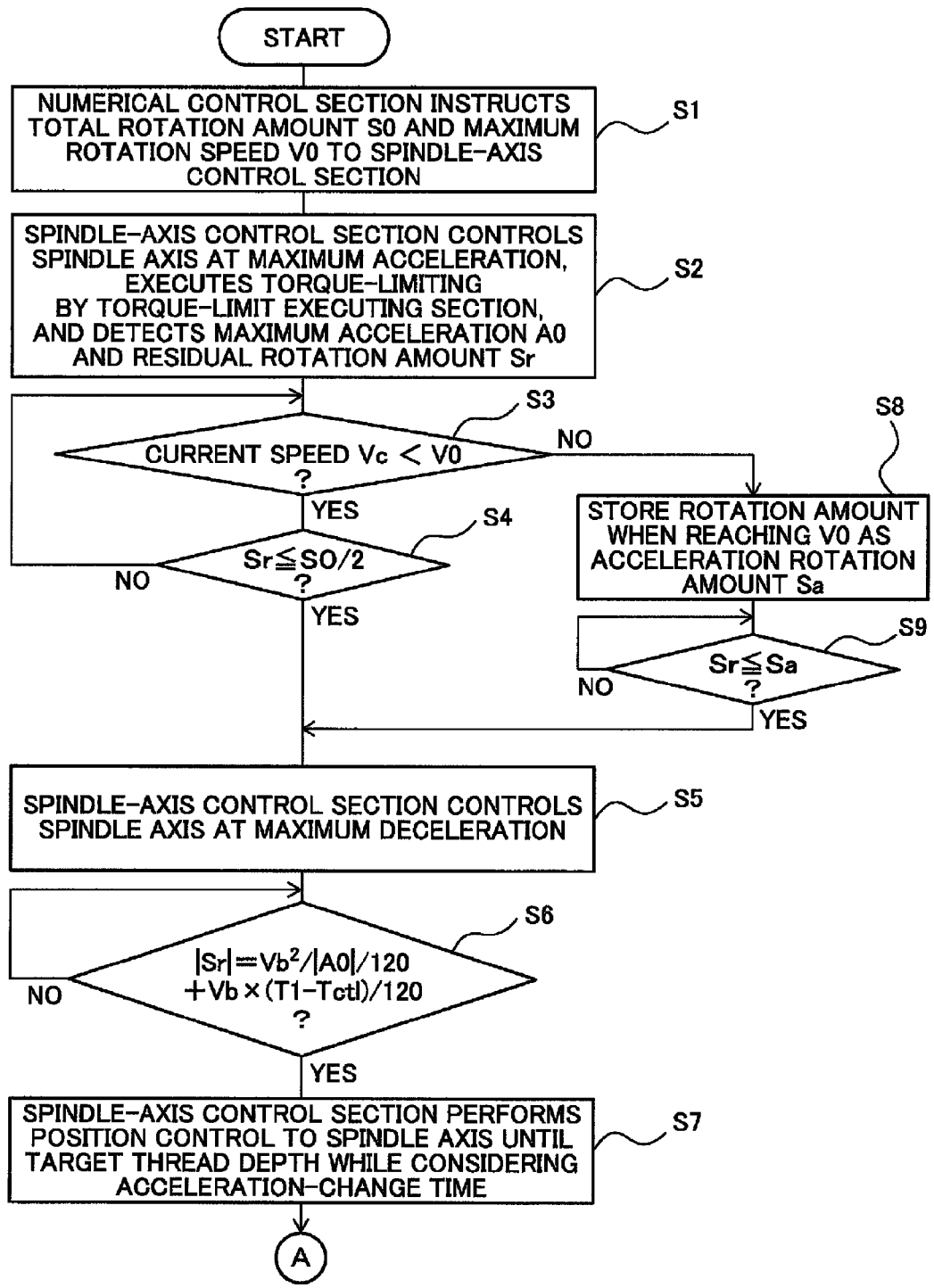
FIG. 2 is a flowchart for showing a cutting motion control method for a tapping process, which is one embodiment of a machine tool control method.

FIG. 2 shows a cutting motion control method adapted to be performed for the spindle axis 12 in a tapping process, as one embodiment of a method of controlling a machine tool executed by the controller 10. The configuration of the controller 10 will be described below in detail, with reference to FIG. 1 and a tapping control flowchart illustrated in FIG. 2. First, at step S1, the numerical control section 16 (the spindle-axis command outputting section 26) instructs the total rotation amount S0 and maximum rotation speed V0 of the spindle axis 12 to the spindle-axis control section 18. At step S2, the spindle-axis control section 18 (the initial-motion control section 30 and the torque-limit executing section 40) makes the spindle axis 12 perform the accelerated rotation at maximum capacity using the maximum permissible current of the drive source, with the maximum rotation speed V0 set as a target speed, to perform the tapping process while executing the aforementioned torque-limiting over the predetermined time from the process start position. Also at step S2, the spindle-axis control section 18 (the maximum-acceleration detecting section 32 and the residual rotation-amount detecting section 34) detects and obtains the maximum acceleration A0 during the accelerated rotation at maximum capacity, and sequentially detects the residual rotation amount Sr from the current position. The spindle-axis control section 18 notifies the detected residual rotation amount Sr to the numerical control section 16 every time it is detected.

The torque-limiting executed by the torque-limit executing section 40 may be configured as follows. When the accelerated rotation of the spindle axis 12 is started at the process start position, the torque command given by the spindle-axis control section 18 (the initial-motion control section 30) to the spindle axis 12 is limited to a predetermined (e.g., null) torque command lower than the maximum torque command provided during the accelerated rotation. During the predetermined time T0 (sec) from the start of acceleration, a limiting value for the torque command is gradually decreased as time passes and thereby the torque command is gradually increased, so that the maximum torque command is given to the spindle axis 12 at an instant when the predetermined time T0 has elapsed from the start of acceleration. In this connection, for example, if a limiting value for the maximum torque command given to the spindle axis 12 is set as 100(%), the limiting value L (%) for the torque command may be determined, using a time t (sec) elapsing from the start of acceleration, as follows:

$$L=100/T0 \times t (\text{note}: 0 \leq t \leq T0).$$

During the initial motion control of the spindle axis 12 (i.e., a velocity control for making the spindle axis 12 perform the accelerated rotation at maximum capacity), which is executed by the initial-motion control section 30, the torque-limiting is executed over the predetermined time T0 by multiplying the torque command given to the spindle axis 12 from the start of processing by the aforementioned limiting value L. As a result, the spindle axis 12 starts the rotation thereof at a sufficiently lower (e.g., null) acceleration relative to the maximum acceleration A0, and gradually increases the acceleration over the predetermined time T0, so as to perform the accelerated rotation at maximum capacity with use of the maximum permissible current (i.e., at the maximum acceleration A0) at the instant when the predetermined time T0 has elapsed. In this connection, the torque command given to the spindle axis 12 during the velocity control is obtained by a velocity processing section (not shown) of the spindle-axis control section 18, which executes an arithmetic processing on the velocity command (i.e., the maximum rotation speed V0) notified from the spindle-axis command outputting section 26 to the spindle-axis control section 18. The alternative configuration may be adopted, in which an additional arithmetic processing is executed by a current processing section (not shown) of the spindle-axis control section 18 on the aforementioned torque command, so as to translate the torque command into a current command, and the current command is send to a spindle motor. Note that the torque limiting time T0 may be set by a system designer applying an experimental rule, and may be stored as one of control parameters in a memory (not shown) of the controller 10.

After step S2, the spindle-axis control section 18 (the current-speed detecting section 36) sequentially detects, at step S3, the current speed Vc during the accelerated rotation at maximum capacity, and judges whether the current speed Vc has not reached the maximum rotation speed V0 every time it is detected. If Vc has not yet reached V0, the spindle-axis control section 18 judges, at step S4, whether the residual rotation amount Sr is equal to or less than one-half of the total rotation amount S0. If Sr is equal to or less than one-half of S0, the spindle-axis control section 18 makes, at step S5, the spindle axis 12 perform the decelerated rotation at maximum capacity using the maximum permissible current of the drive source, so as to continuously perform the tapping process (or the cutting motion). If Sr is not equal to or not less than one-half of S0, the control flow returns to step S3.

Figure 3:
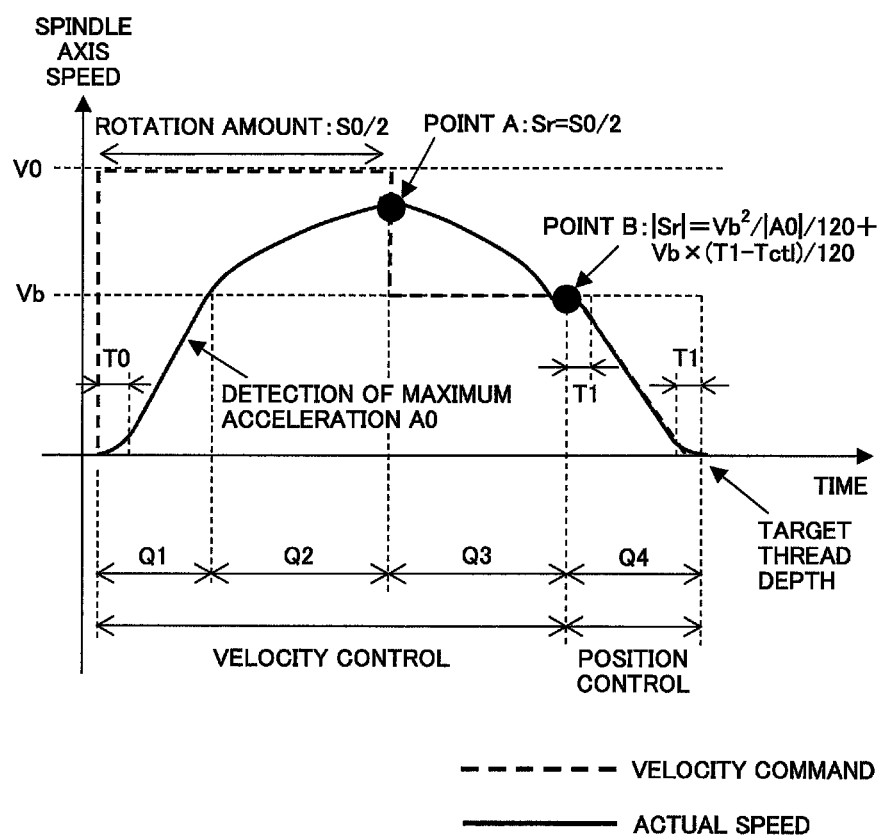
FIG. 3 is a diagram showing one example of the cutting motion of a spindle axis.

Referring now to FIG. 3, one example of the motion of the spindle axis 12, in the case where the residual rotation amount Sr reaches one-half of the total rotation amount S0 before the current speed Vc reaches the maximum rotation speed V0 (i.e., in the case where the judgment results at respective steps S3 and S4 are YES), is depicted by a speed-time curve. In FIG. 3, a rotational speed Vb (e.g., the base speed of the spindle motor) is previously determined for the spindle axis 12, such that an acceleration with a constant torque (i.e., a constant acceleration) can be performed from the start of operation to the speed Vb, and may be stored as one of control parameters in a memory (not shown) of the controller 10. In practice, the speed Vb may take any value equal to or less than the base speed of the spindle motor (or a speed determined by taking into account a reduction ratio, if any, between the spindle motor and the spindle axis 12).

The accelerated rotation at maximum capacity of the spindle axis 12 (including the torque limiting) at step S2 is performed during time periods Q1 and Q2 shown in FIG. 3, and the maximum acceleration A0 is detected during the constant acceleration in time period Q1 except for the predetermined torque-limiting time T0 just after the start of processing. When the rotational speed of the spindle axis 12 exceeds Vb, the acceleration of the spindle axis 12 gradually decreases from the maximum acceleration A0 due to the characteristics of the spindle motor. At a time point A when the residual rotation amount Sr reaches one-half of the total rotation amount S0 (i.e., when the rotation amount from the start of processing reaches one-half of the total rotation amount S0) (or when the judgment result at step S4 becomes YES), the motion of the spindle axis 12 changes from the accelerated rotation to the decelerated rotation, and in time period Q3, the spindle axis 12 performs the decelerated rotation at maximum capacity at step S5. During the time period Q3, the spindle axis 12 is made to perform the decelerated rotation from the point A with the speed Vb set as a target value, and the deceleration of the spindle axis 12 is gradually increased due to the characteristics of the spindle motor. During the decelerated rotation at maximum capacity, the spindle-axis control section 18 (the residual rotation-amount detecting section 34 and the current-speed detecting section 36) also sequentially detects the residual rotation amount Sr from the current position and the current speed Vc, of the spindle axis 12. In this way, in the time periods Q1, Q2 and Q3, the spindle-axis control section 18 executes a velocity control for the spindle axis 12 (a stepwise velocity command is illustrated by a broken line in FIG. 3).

In the motion example of FIG. 3, the spindle-axis control section 18 (the positioning-motion control section 38) controls, after time period Q3 (i.e., the velocity control), the cutting motion of the spindle axis 12 while taking into account the acceleration-change time T1 for gradually changing the acceleration as time passes. In this configuration, the spindle-axis control section 18 (the positioning-motion control section 38) monitors the residual rotation amount Sr (rev) and the current speed Vc (min$^{-1}$), which are sequentially detected during the maximum deceleration control at step S5, and determines the position of a time point B (FIG. 3), at which it is expected that the residual rotation amount Sr becomes equal to 0 (i.e., the spindle axis reaches the target thread depth) when the spindle axis is decelerated from the current speed Vc (min$^{-1}$) at the maximum deceleration A0 (negative value) corresponding to the maximum acceleration A0 (min$^{-1}$/s) while taking into account the acceleration-change time T1 (sec). The position of the point B is determined, as the absolute value of the residual rotation amount Sr (negative value) as seen from the point of Sr=0, by the following equation:

$$|Sr|=Vc^2/|A0|/120+Vc\times(T1-Tctl)/120.$$

Note that Tctl (sec) means a cycle of controls executed by the spindle-axis control section 18 (the positioning-motion control section 38) (i.e., a cycle of provisions and notifications of position commands to the spindle axis 12).

In this embodiment, it is premised that the spindle axis 12 is decelerated at the maximum deceleration A0 from the point B while taking into account the acceleration-change time T1 (sec). Accordingly, it is assumed that the current speed Vc of the spindle axis 12 has reached Vb at the point B. As a result, the position |Sr| of the point B can be determined, using the predetermined speed Vb, as:

$$|Sr|=Vb^2/|A0|/120+Vb\times(T1-Tctl)/120.$$

It is also assumed, in this embodiment, that a torque necessary for acceleration of the spindle axis 12 (hereinafter referred to as an acceleration torque) is equal to a torque necessary for deceleration of the spindle axis 12 (hereinafter referred to as a deceleration torque). In general, mechanical load (or resistance) arises during the rotation of the spindle axis 12 and thus the acceleration torque becomes larger than the deceleration torque. Therefore, if the acceleration torque is equal to the deceleration torque, a time required for the acceleration at maximum capacity becomes longer than a time required for the deceleration at maximum capacity provided that the changes of speed thereof correspond to each other. Accordingly, in practice, the spindle axis 12 decelerating from the point A reaches the speed Vb in a time period shorter than the time period Q2, and the position |Sr| is represented by:

$$|Sr|>Vc^2/|A0|/120+Vc\times(T1-Tctl)/120;\text{ and thereafter,}$$

the spindle axis 12 rotates at the constant speed Vb for a very short time, so as to reach the point B represented by:

$$|Sr|=Vb^2/|A0|/120+Vb\times(T1-Tctl)/120(\text{see FIG.3}).$$

The motion example of FIG. 3 has a configuration wherein, in time period Q4 after the time period Q3, the acceleration-change time T1 is provided for a time when the motion of the spindle axis 12 transitions from the constant speed Vb (i.e., null acceleration) in the very short time to the maximum deceleration A0, and the deceleration of the spindle axis 12 gradually increases from zero to the maximum deceleration A0 as time passes in the acceleration-change time T1. The motion example of FIG. 3 also has a configuration wherein, in the time period Q4 after the time period Q3, the other or second acceleration-change time T1 is provided for a time when the motion of the spindle axis 12 transitions from the maximum deceleration A0 to the stoppage at the target thread depth (i.e., null acceleration), and the deceleration of the spindle axis 12 gradually decreases from the maximum deceleration A0 to zero as time passes in the second acceleration-change time T1. In this connection, the change rate of the deceleration of the spindle axis 12 in the acceleration-change time T1 is represented as: |A0|/T1 (min$^{-1}$/s$^2$). The acceleration-change time T1 may be set by a system designer applying an experimental rule, and may be stored as one of control parameters in a memory (not shown) of the controller 10.

Turning back to FIG. 2, at step S6, the spindle-axis control section 18 (the positioning-motion control section 38) judges whether the absolute value |Sr| of the residual rotation amount at the current position of the spindle axis 12 satisfies the equation:
|Sr|=Vb$^2$/|A0|/120+Vb×(T1−Tctl)/120 (hereinafter referred to as equation 1) (i.e., whether or not the rotational position of the spindle axis 12 has reached the point B). If the equation 1 is satisfied, the spindle-axis control section 18 (the positioning-motion control section 38) prepares, at step S7, a command for making the spindle axis 12 perform the decelerated rotation at the maximum deceleration A0 while taking into account the acceleration-change time T1 and reach the point of Sr=0 (i.e., the target thread depth) (in the motion example of FIG. 3, a command for stopping the spindle axis 12 at the target thread depth), and executes a position control for the spindle axis 12 with use of the prepared command. If the equation 1 is not satisfied, the judgment at step S6 is repeated until the equation 1 is satisfied. The spindle axis 12 performs, in accordance with the command from the spindle-axis control section 18 (the positioning-motion control section 38), the tapping process from the point B toward the target thread depth, by performing the decelerated rotation, at the gradually changing deceleration lower than the maximum deceleration A0 during the acceleration-change time T1 while at maximum deceleration A0 during the time except for the acceleration-change time T1, and reaches the target thread depth when Sr becomes equal to 0 (in the motion example of FIG. 3, the spindle axis is stopped at the target thread depth). In this way, in the time period Q4 (FIG. 3) in which the spindle axis operates from the point B to reach the target thread depth, the spindle-axis control section 18 executes a position control for the spindle axis 12.

If it is judged, at step S3, that the current speed Vc has reached the maximum rotation speed V0, the spindle-axis control section 18 stores, at step S8, a rotation amount of the spindle axis 12 from the process start position (i.e., a rotational position FBS) at an instant when the spindle axis reaches the maximum rotation speed V0, as an acceleration rotation amount Sa. Then, at step S9, the spindle-axis control section 18 judges whether the residual rotation amount Sr is equal to or less than the acceleration rotation amount Sa. If Sr is equal to or less than Sa, the control flow goes to step S5, and subsequently executes steps S6 and S7, so as to perform the process until the target thread depth. If Sr is not equal to or not less than Sa, the judgment at step S9 is repeated until Sr becomes equal to or less than Sa.

During a period when the spindle-axis control section 18 controls the rotational motion of the spindle axis 12 from the process start position to the target thread depth, the feed-axis control section 22 controls the feed axis 14 so as to perform a feed motion while following the motion of the spindle axis 12, with use of the rotational position FBS of the spindle axis 12. During a period when the spindle-axis control section 18 executes the processes from step S1 to step S9, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

Figure 4:
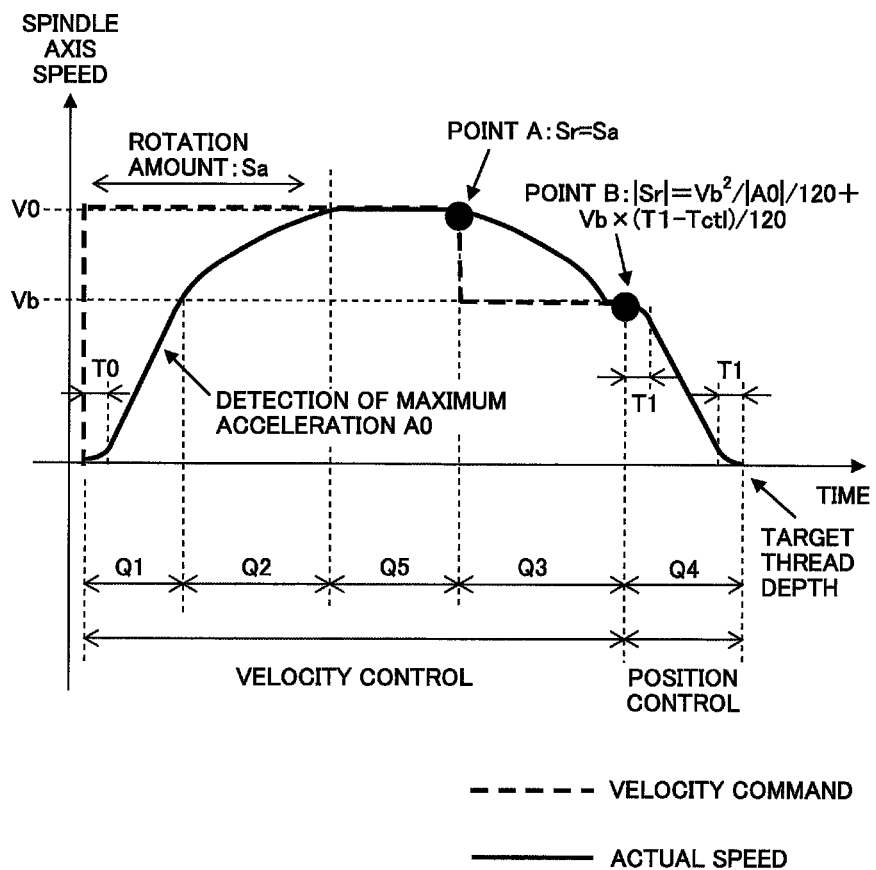
FIG. 4 is a diagram showing another example of the cutting motion of the spindle axis.

FIG. 4 shows one example of the motion of the spindle axis 12 by a speed-time curve, in the case where the current speed Vc reaches the maximum rotation speed V0 before the residual rotation amount Sr reaches one-half of the total rotation amount S0 (i.e., in the case where the judgment result at step S3 is No). As shown in FIG. 4, the accelerated rotation of the spindle axis 12 at maximum capacity (including the torque limiting time T0) at step S2 is performed during time periods Q1 and Q2, so that the current speed Vc of the spindle axis 12 reaches the maximum rotation speed V0. Thereafter, the spindle axis 12 rotates at the constant speed V0 over the time period Q5 so as to continue the tapping process. At a time point A when the residual rotation amount Sr becomes equal to the acceleration rotation amount Sa (i.e., when the judgment result at S9 becomes YES), the motion of the spindle axis 12 changes from the accelerated rotation to the decelerated rotation, and in time period Q3, the spindle axis 12 performs the decelerated rotation at maximum capacity at step S5, and thereafter, in time period Q4, a position control for the spindle axis 12 (taking into account the acceleration-change time T1) at step S7 is executed. In the time periods Q1, Q2, Q3 and Q4, the spindle axis 12 operates in the same manner as the motion shown in FIG. 3.

Figure 5:
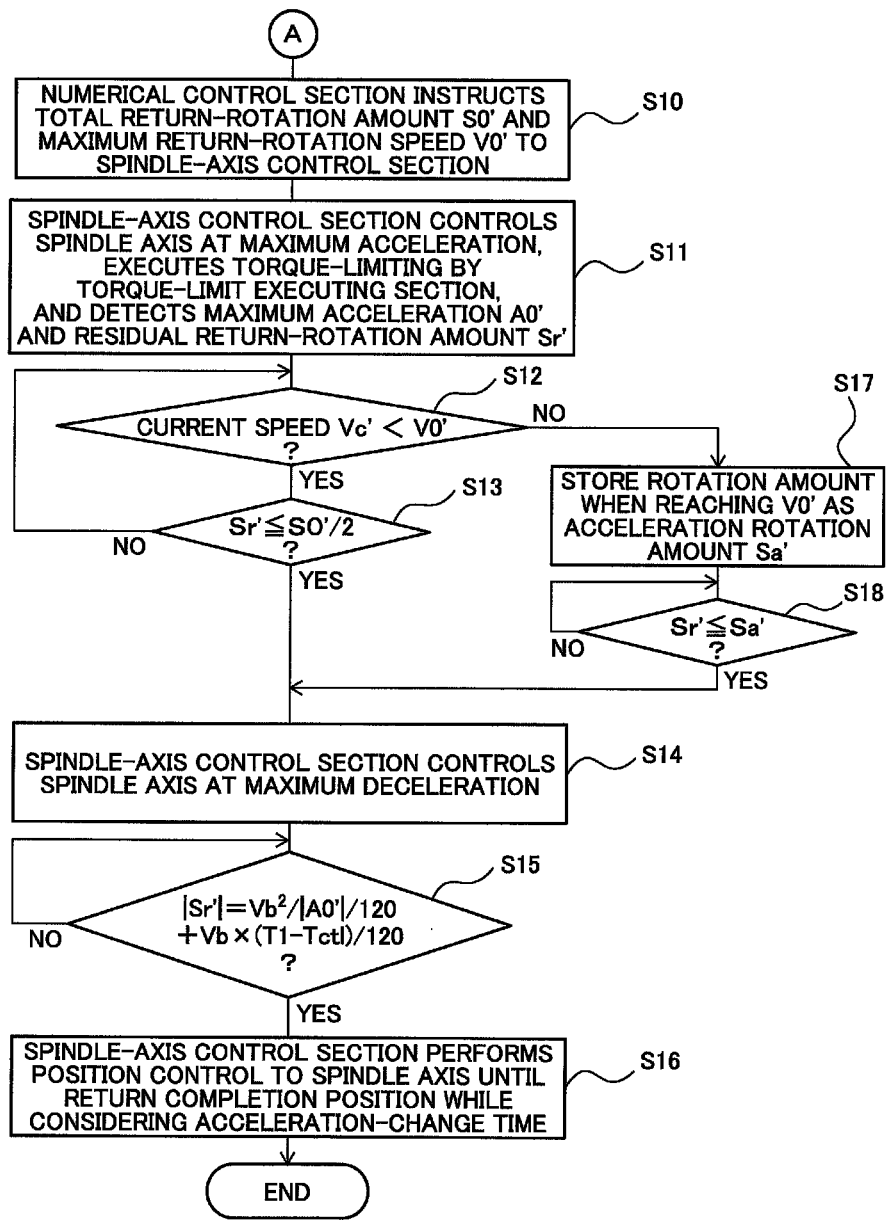
FIG. 5 is a flowchart for showing a return motion control method for a tapping process, which is one embodiment of a machine tool control method.
Figure 6:
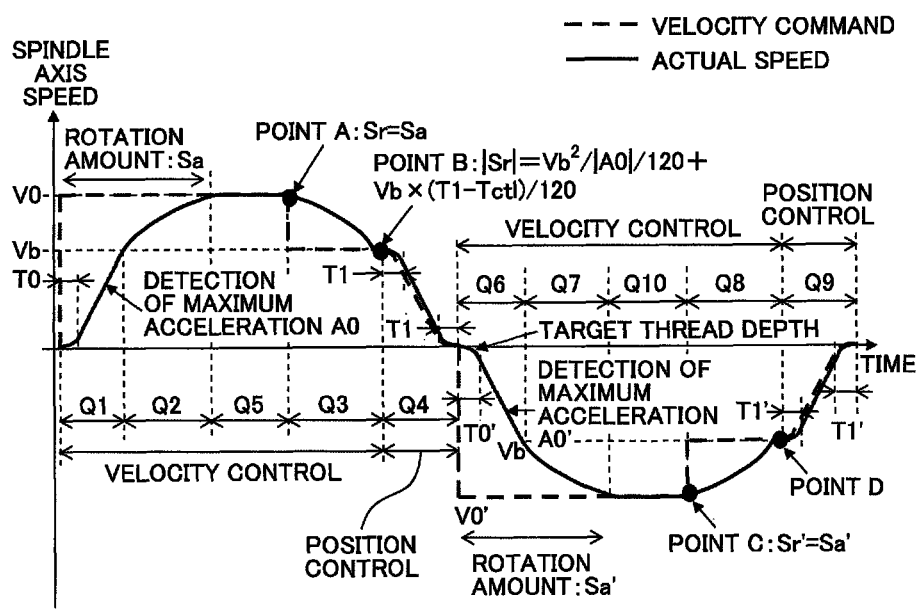
FIG. 6 is a diagram showing one example of the cutting and return motion of the spindle axis.

In a tapping process using a machine tool, it is necessary to perform a return motion of the spindle axis 12 for pulling out a tool from a workpiece after cutting a pilot hole to the workpiece until a target thread depth. In the case where the aforementioned embodiment has a configuration wherein the positioning-motion control section 38 makes the spindle axis 12 perform the decelerated rotation at maximum capacity and stop at the target thread depth, the controller 10 is capable of controlling the return motion in a manner similar to the aforementioned control of the cutting motion until the target thread depth. FIG. 5 shows a return motion control method adapted to be performed for the spindle axis 12 in a tapping process, as one embodiment of a method of controlling a machine tool executed by the controller 10. FIG. 6 shows one example of the motion of the spindle axis 12 by a speed-time curve, from a process start position through a target thread depth to a return completion position, in the case where the spindle axis 12 is made to perform the return motion corresponding to the cutting motion shown in FIG. 4. Note that the cutting motion of the spindle axis 12 shown in FIG. 6 is the same as the cutting motion of FIG. 4. With reference to FIGS. 5 and 6 in addition to FIG. 1, one example of a control flow of the return motion executed by the controller 10 will be described below.

After it is judged that the tapping process has reached the target thread depth in the process flow shown in FIG. 2, the numerical control section 16 (the spindle-axis command outputting section 26) obtains, at step S10, a total return-rotation amount S0' and a maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as a spindle-axis command CS to the spindle-axis control section 18. The spindle-axis command CS for the return motion also does not include a position command and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0' is equal to the total rotation amount S0 in the cutting motion, but the maximum return-rotation speed V0' is not always equal to the maximum rotation speed V0 in the cutting motion.

At step S11, the spindle-axis control section 18 (the initial-motion control section 30, the maximum-acceleration detecting section 32, the residual rotation-amount detecting section 34 and the torque-limit executing section 40) executes the following processes. The initial-motion control section 30 makes the spindle axis 12 perform an accelerated inverse rotation at maximum capacity using the maximum permissible current of the drive source, from the target thread depth toward the return completion position, with the maximum return-rotation speed V0' set as a target value, so as to perform the return motion. The torque-limit executing section 40 executes a torque limiting for the initial-motion control section 30 during a period when the initial-motion control section 30 makes the spindle axis 12 perform the accelerated inverse rotation, in such a manner that, at a start of acceleration, a predetermined torque command lower than a maximum torque command provided for the accelerated inverse rotation at maximum capacity is given to the spindle axis 12, and during a predetermined time T0' elapsing from the start of acceleration, the predetermined torque command is gradually increased so that the maximum torque command is given to the spindle axis 12 at an instant when the predetermined time T0' has elapsed. In this connection, for example, if a limiting value for the maximum torque command given to the spindle axis 12 is set as 100(%), the limiting value L (%) for the torque command may be determined, using a time t (sec) elapsing from the start of acceleration, as follows: L=100/T0'×t (note: 0≤t≤T0'). The maximum-acceleration detecting section 32 detects a maximum acceleration A0' of inverse rotation during the accelerated inverse rotation at maximum capacity, based on the rotational position FBS. The residual rotation-amount detecting section 34 sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected. Note that the torque limiting time T0' may be set by a system designer applying an experimental rule, and may be stored as one of control parameters in a memory (not shown) of the controller 10.

Next, at step S12, the spindle-axis control section (the current-speed detecting section 36) sequentially detects a current speed Vc' of inverse rotation of the spindle axis based on the rotational position FBS during the accelerated inverse rotation at maximum capacity, and judges whether the current speed Vc' has not reached the maximum return-rotation speed V0' every time it is detected. If Vc' has not reached V0', the spindle-axis control section 18 judges, at step S13, whether the residual return-rotation amount Sr' is equal to or less than one-half of the total return-rotation amount S0'. If Sr' is equal to or less than one-half of S0', the spindle-axis control section 18 makes, at step S14, the spindle axis 12 perform a decelerated inverse rotation at maximum capacity using the maximum permissible current of the drive source, so as to continuously perform the return motion. If Sr' is not equal to or not less than one-half of S0', the control flow returns to step S12.

If it is judged, at step S12, that the current speed Vc' has reached the maximum return-rotation speed V0', the spindle-axis control section 18 stores, at step S17, a rotation amount of the spindle axis 12 from the target thread depth (i.e., a rotational position FBS) at an instant when the spindle axis reaches the maximum return-rotation speed V0', as an acceleration rotation amount Sa' of the return motion. Then, at step S18, the spindle-axis control section 18 judges whether the residual return-rotation amount Sr' is equal to or less than the acceleration rotation amount Sa'. If Sr' is equal to or less than Sa', the spindle-axis control section 18 makes, at step S14, the spindle axis 12 perform the decelerated inverse rotation at maximum capacity using the maximum permissible current of the drive source, so as to continuously perform the return motion. If Sr' is not equal to or not less than Sa', the judgment at step S18 is repeated until Sr' becomes equal to or less than Sa'.

Referring now to FIG. 6, one example of the return motion of the spindle axis 12, in the case where the current speed Vc' reaches the maximum return-rotation speed V0' before the residual return-rotation amount Sr' reaches one-half of the total return-rotation amount S0' (i.e., in the case where the judgment result at step S12 is No), is depicted by a speed-time curve. As shown in FIG. 6, the accelerated inverse rotation of the spindle axis 12 at maximum capacity (including the torque limiting) at step S11 is performed during time periods Q6 and Q7, and the maximum acceleration A0' of inverse rotation is detected during a constant acceleration in time period Q6 except for the predetermined torque-limiting time T0' just after the start of processing. When the rotational speed of the spindle axis 12 exceeds Vb, the acceleration of the spindle axis 12 gradually decreases from the maximum acceleration A0' due to the characteristics of the spindle motor. The current speed Vc' of the spindle axis 12 reaches the maximum return-rotation speed V0' before the residual return-rotation amount Sr' reaches one-half of the total return-rotation amount S0', and thereafter, the spindle axis 12 inversely rotates at the constant speed V0' over the time period Q10 so as to continue the return motion. At a time point C when the residual return-rotation amount Sr' becomes equal to the acceleration rotation amount Sa' (i.e., when the judgment result at S18 becomes YES), the motion of the spindle axis 12 changes from the accelerated inverse rotation to the decelerated inverse rotation, and in time period Q8, the spindle axis 12 performs the decelerated inverse rotation at maximum capacity at step S14. During the time period Q8, the spindle axis 12 is made to perform the decelerated inverse rotation from the point C with the speed Vb set as a target value, and the deceleration of the spindle axis 12 is gradually increased due to the characteristics of the spindle motor. During the decelerated inverse rotation at maximum capacity, the spindle-axis control section 18 (the residual rotation-amount detecting section 34 and the current-speed detecting section 36) also sequentially detects the residual return-rotation amount Sr' from the current position and the current speed Vc', of the spindle axis 12. In this way, in the time periods Q6, Q7, Q10 and Q8, the spindle-axis control section 18 executes a velocity control for the spindle axis 12 (a stepwise velocity command is illustrated by a broken line in FIG. 6).

In the motion example of FIG. 6, the spindle-axis control section 18 (the positioning-motion control section 38) controls, after time period Q8 (i.e., the velocity control), the return motion of the spindle axis 12 while taking into account an acceleration-change time T1' for gradually changing the acceleration as time passes. In this configuration, the spindle-axis control section 18 (the positioning-motion control section 38) monitors the residual return-rotation amount Sr' (rev) and the current speed Vc' ($min^{-1}$), which are sequentially detected during the maximum deceleration control at step S14, and determines the position of a time point D at which it is expected that the residual return-rotation amount Sr' becomes equal to 0 (i.e., the spindle axis reaches the return completion position) when the spindle axis is decelerated from the current speed Vc' ($min^{-1}$) at the maximum deceleration A0' (negative value) corresponding to the maximum acceleration A0' ($min^{-1}$/s) while taking into account the acceleration-change time T1' (sec). The position of the point D is determined, as the absolute value of the residual return-rotation amount Sr' (negative value) as seen from the point of Sr'=0, by the following equation:

$$|Sr'|=Vc'^2/|A0'|/120+Vc' \times (T1'-Tctl)/120.$$

In this embodiment, it is premised on that the spindle axis 12 is decelerated at the maximum deceleration A0' from the point D while taking into account the acceleration-change time T1' (sec). Accordingly, it is assumed that the current speed Vc' of the spindle axis 12 has reached Vb at the point D. As a result, the position |Sr'| of the point D can be determined, using the predetermined speed Vb, as:

$$|Sr'|=Vb^2/|A0'|/120+Vb \times (T1'-Tctl)/120.$$

The motion example of FIG. 6 has a configuration wherein, in time period Q9 after the time period Q8, the acceleration-change time T1' is provided for a time when the motion of the spindle axis 12 transitions from the constant speed Vb (i.e., null acceleration) in the very short time to the maximum deceleration A0', and the deceleration of the spindle axis 12 gradually increases from zero to the maximum deceleration A0' as time passes in the acceleration-change time T1'. The motion example of FIG. 6 also has a configuration wherein, in the time period Q9 after the time period Q8, the other or second acceleration-change time T1' is provided for a time when the motion of the spindle axis 12 transitions from the maximum deceleration A0' to the stoppage at the return completion position (i.e., null acceleration), and the deceleration of the spindle axis 12 gradually decreases from the maximum deceleration A0' to zero as time passes in the second acceleration-change time T1'. In this connection, the change rate of the deceleration of the spindle axis 12 in the acceleration-change time T1' is represented as: |A0'|/T1' ($min^{-1}/s^2$). The acceleration-change time T1' may be set by a system designer applying an experimental rule, and may be stored as one of control parameters in a memory (not shown) of the controller 10.

Turning back to FIG. 5, at step S15, the spindle-axis control section 18 (the positioning-motion control section 38) judges whether the absolute value |Sr'| of the residual return-rotation amount Sr' at the current position of the spindle axis 12 satisfies the equation:
|Sr'|=Vb²/|A0'|/120+Vb×(T1'−Tctl)/120    (hereinafter referred to as equation 2) (i.e., whether or not the rotational position of the spindle axis 12 has reached the point D). If the equation 2 is satisfied, the spindle-axis control section 18 (the positioning-motion control section 38) prepares, at step S16, a command for making the spindle axis 12 perform the decelerated inverse rotation at the maximum deceleration A0' while taking into account the acceleration-change time T1' and stop at the point of Sr'=0 (i.e., the return completion position), and executes a position control for the spindle axis 12 with use of the prepared command. If the equation 2 is not satisfied, the judgment at step S15 is repeated until the equation 2 is satisfied. The spindle axis 12 performs, in accordance with the command from the spindle-axis control section 18 (the positioning-motion control section 38), the return motion from the point D toward the return completion position, by performing the decelerated inverse rotation, at the gradually changing deceleration lower than the maximum deceleration A0' during the acceleration-change time T1' while at the maximum deceleration A0' during the time except for the acceleration-change time T1', and stops at the return completion position when Sr' becomes equal to 0. In this way, in the time period Q9 (FIG. 6) in which the spindle axis operates from the point D to reach the return completion position, the spindle-axis control section 18 executes a position control for the spindle axis 12.

As shown in FIG. 6, the return motion of the spindle axis 12 can be represented by a speed-time curve similar to that of the cutting motion of the spindle axis 12. In the case where the total return-rotation amount S0' and the maximum return-rotation speed V0' are equal to the total rotation amount S0 and the maximum rotation speed V0 for the cutting motion, respectively, the cutting motion and the return motion show substantially the same speed-time curve. On the other hand, in the case where the total return-rotation amount S0' and the maximum return-rotation speed V0' are different from the total rotation amount S0 and the maximum rotation speed V0 for the cutting motion, respectively, the cutting motion and the return motion do not always show the same speed-time curve.

During a period when the spindle-axis control section 18 controls the inverse rotational motion of the spindle axis 12 from the target thread depth to the return completion position, the feed-axis control section 22 controls the feed axis 14 so as to perform an inverse feed motion while following the motion of the spindle axis 12, with use of the rotational position FBS of the spindle axis 12. During a period when the spindle-axis control section 18 executes the processes from step S10 to step S18, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

The controller 10 according to the above embodiment has a configuration wherein, when the spindle axis 12 is made to perform the cutting motion from the process start position to the target thread depth, the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 during the accelerating step and the sequentially detected residual rotation amount Sr and current speed Vc of the spindle axis 12, the cutting motion until the target thread depth in the shortest time while decelerating the spindle axis 12 at the maximum deceleration A0 so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, during the period when the spindle-axis control section 18 makes the spindle axis 12 perform the accelerated rotation at maximum capacity, the torque-limiting is executed in the predetermined time T0 elapsing from the start of acceleration, so that it is possible for the spindle axis 12 to start the rotation thereof at a sufficiently lower (e.g., null) acceleration relative to the maximum acceleration A0 and thereafter gradually increase the acceleration so as to perform the accelerated rotation at the maximum acceleration A0 at the instant when the predetermined time T0 has elapsed. Therefore, according to the controller 10, it is possible to prevent the acceleration of the spindle axis 12 from rapidly changing at the start of acceleration, so that it is possible to reduce a mechanical or structural shock that may be caused on the spindle axis 12 due to the change in the acceleration, and also to reduce a synchronization error that may be caused between the spindle axis 12 and the feed axis 14 due to the change in the acceleration.

Moreover, if the configuration such as the motion example shown in FIG. 3 wherein, when the spindle axis 12 is made to perform the decelerated rotation at maximum capacity, the position control of the spindle axis 12 is executed in consideration of the acceleration-change time T1, is adopted, it is possible for the spindle axis 12 to start at a sufficiently lower (e.g., null) deceleration relative to the maximum deceleration A0 and thereafter gradually increase the deceleration so as to perform the decelerated rotation at the maximum deceleration A0 at the instant when the acceleration-change time T1 has elapsed. Therefore, according to this configuration, it is possible to prevent the deceleration of the spindle axis 12 from rapidly changing during the decelerated rotation (at the point B) or at the stoppage at the target thread depth, so that it is possible to reduce a mechanical or structural shock that may be caused on the spindle axis 12 due to the change in the deceleration, and also to reduce a synchronization error that may be caused between the spindle axis 12 and the feed axis 14 due to the change in the deceleration. Note that, the acceleration-change time T1 may be provided for at least one of a time just after the point B and a time just before the target thread depth.

In addition, the controller 10 according to the above embodiment has a configuration wherein, when the spindle axis 12 is made to perform the return motion from the target thread depth to the return completion position, the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by accelerating the spindle axis 12 with the maximum power using the maximum permissible current, aiming at the maximum return-rotation speed V0', and continuously performs, based on the maximum acceleration A0' during the accelerating step and the sequentially detected residual return-rotation amount Sr' and current speed Vc' of the spindle axis 12, the return motion until the return completion position in the shortest time while decelerating the spindle axis 12 at the maximum deceleration A0' so as to make the spindle axis stop at the return complete position. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 has a configuration wherein, during the period when the spindle-axis control section 18 makes the spindle axis 12 perform the accelerated inverse rotation at maximum capacity, the torque-limiting is executed in the predetermined time T0' elapsing from the start of acceleration, so that it is possible for the spindle axis 12 to start the inverse rotation thereof at a sufficiently lower (e.g., null) acceleration relative to the maximum acceleration A0' and thereafter gradually increase the acceleration so as to perform the accelerated inverse rotation at the maximum acceleration A0' at the instant when the predetermined time T0' has elapsed. Therefore, according to the controller 10, it is possible to prevent the acceleration of the spindle axis 12 from rapidly changing at the start of acceleration, so that it is possible to reduce a mechanical or structural shock that may be caused on the spindle axis 12 due to the change in the acceleration, and also to reduce a synchronization error that may be caused between the spindle axis 12 and the feed axis 14 due to the change in the acceleration.

Moreover, if the configuration such as the motion example shown in FIG. 6 wherein, when the spindle axis 12 is made to perform the decelerated inverse rotation at maximum capacity, the position control of the spindle axis 12 is executed in consideration of the acceleration-change time T1', is adopted, it is possible for the spindle axis 12 to start at a sufficiently lower (e.g., null) deceleration relative to the maximum deceleration A0' and thereafter gradually increase the deceleration so as to perform the decelerated inverse rotation at the maximum deceleration A0' at the instant when the acceleration-change time T1' has elapsed. Therefore, according to this configuration, it is possible to prevent the deceleration of the spindle axis 12 from rapidly changing during the decelerated inverse rotation (at the point D) or at the stoppage at the return completion position, so that it is possible to reduce a mechanical or structural shock that may be caused on the spindle axis 12 due to the change in the deceleration, and also to reduce a synchronization error that may be caused between the spindle axis 12 and the feed axis 14 due to the change in the deceleration. Note that, the acceleration-change time T1' may be provided for at least one of a time just after the point D and a time just before the return completion position.

The configuration of the controller 10 of the above embodiment can be described as a machine tool control method for controlling a synchronized operation of the spindle axis 12 and the feed axis 14. This control method includes the acts, executed by the controller 10, of obtaining, from a tapping program P, a total rotation amount S0 and a maximum rotation speed V0 of the spindle axis 12 during a period when the spindle axis 12 operates from a process start position to a target thread depth; making the spindle axis 12 perform an accelerated rotation at maximum capacity, from the process start position toward the target thread depth, with the maximum rotation speed V0 set as a target value, while executing a torque-limiting in such a manner that, at a start of acceleration, a predetermined torque command lower than a maximum torque command provided for the accelerated rotation at maximum capacity is given to the spindle axis 12, and during a predetermined time T0 elapsing from the start of acceleration, the predetermined torque command is gradually increased so that the maximum torque command is given to the spindle axis 12 at an instant when the predetermined time T0 has elapsed; detecting a maximum acceleration A0 during the accelerated rotation at maximum capacity, based on a rotational position feedback FBS of the spindle axis 12; detecting a residual rotation amount Sr of the spindle axis 12 during a period when the spindle axis operates from a current position to the target thread depth, based on the total rotation amount S0 and the rotational position feedback FBS; detecting a current speed Vc of the spindle axis 12 based on the rotational position feedback FBS; and making the spindle axis 12 perform a decelerated rotation at maximum capacity so as to reach the target thread depth, after the accelerated rotation at maximum capacity, based on the maximum acceleration A0, the residual rotation amount Sr and the current speed Vc. This control method may be configured to make the spindle axis 12 reach the target thread depth, after the accelerated rotation at maximum capacity of the spindle axis 12, based on the maximum acceleration A0, the residual rotation amount Sr, the current speed Vc and a predetermined acceleration-change time T1, by making the spindle axis 12 perform a decelerated rotation at an acceleration lower than the maximum acceleration A0 and changing at a predetermined rate A0/T1 during the acceleration-change time T1, while making the spindle axis 12 perform the decelerated rotation at maximum capacity during a time except for the acceleration-change time T1.

The above control method also includes the acts, executed by a controller 10, of obtaining, from a tapping program P, a total return-rotation amount S0' and a maximum return-rotation speed V0' of the spindle axis 12 during a period when the spindle axis 12 operates from a target thread depth to a return completion position; making the spindle axis 12 perform an accelerated inverse rotation at maximum capacity, from the target thread depth toward the return completion position, with the maximum return-rotation speed V0' set as a target value, while executing a torque-limiting in such a manner that, at a start of acceleration, a predetermined torque command lower than a maximum torque command provided for the accelerated inverse rotation at maximum capacity is given to the spindle axis 12, and during a predetermined time T0' elapsing from the start of acceleration, the predetermined torque command is gradually increased so that the maximum torque command is given to the spindle axis 12 at an instant when the predetermined time T0' has elapsed; detecting a maximum acceleration A0' of inverse rotation during the accelerated inverse rotation at maximum capacity, based on a rotational position feedback FBS of the spindle axis 12; detecting a residual return-rotation amount Sr' of the spindle axis 12 during a period when the spindle axis operates from a current position to the return completion position, based on the total return-rotation amount S0' and the rotational position feedback FBS; detecting a current speed Vc' of inverse rotation of the spindle axis 12 based on the rotational position feedback FBS; and making the spindle axis 12 perform a decelerated inverse rotation at maximum capacity so as to stop at the return completion position, after the accelerated inverse rotation at maximum capacity, based on the maximum acceleration A0' of inverse rotation, the residual return-rotation amount Sr' and the current speed Vc' of inverse rotation. This control method may be configured to make the spindle axis 12 stop at the return completion position, after the accelerated inverse rotation at maximum capacity, based on the maximum acceleration A0' of inverse rotation, the residual return-rotation amount Sr', the current speed Vc' of inverse rotation and a predetermined acceleration-change time T1', by making the spindle axis 12 perform a decelerated inverse rotation at an acceleration lower than the maximum acceleration A0' of inverse rotation and changing at a predetermined rate A0'/T1' during the acceleration-change time T1', while making the spindle axis 12 perform the decelerated inverse rotation at maximum capacity during a time except for the acceleration-change time T1'.

In the motion examples described with reference to FIGS. 3 and 4 as examples of the cutting motion control method executed for the spindle axis 12 by the controller 10, it is premised that the maximum rotation speed V0 of the spindle axis 12 is higher than the predetermined speed Vb (e.g., the base speed of the spindle motor). In contrast, in some machine tool configurations, the maximum rotation speed V0 of the spindle axis 12 may be lower than the speed Vb. In this case, time periods Q2 and Q3 in FIGS. 3 and 4 are omitted, and the spindle axis 12 operates at a generally constant acceleration and deceleration from the process start position to the target thread depth.

Figure 7:
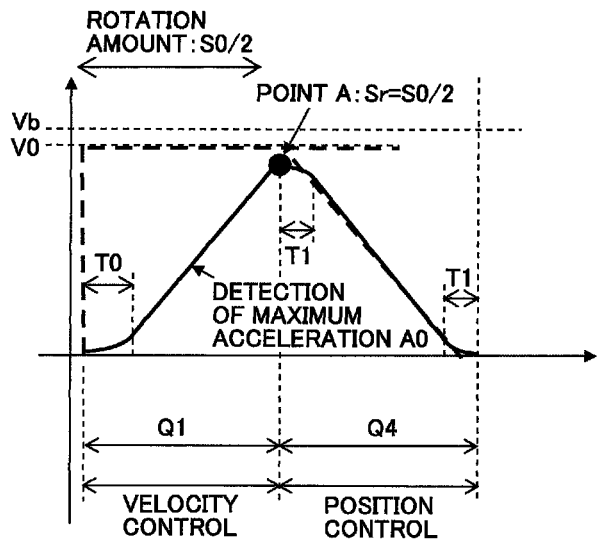
FIG. 7 is a diagram showing a further example of the cutting motion of the spindle axis.

FIG. 7 shows the motion of the spindle axis 12 by a speed-time curve, in the case where the residual rotation amount Sr reaches one-half of the total rotation amount S0 before the current speed Vc reaches the maximum rotation speed V0 (<Vb) (i.e., in the case where the judgment results at steps S3 and S4 of FIG. 2 are YES). As illustrated, the spindle axis 12 performs only the motions in the time periods Q1 and Q4 shown in FIG. 3. More specifically, the spindle axis 12 performs, in the time period Q1, the accelerated rotation at the maximum acceleration A0, with the maximum rotation speed V0 set as a target value, while executing the torque-limiting over the predetermined time T0, and at the time point A when Sr reaches one-half of S0, shifts from the accelerated rotation to the decelerated rotation, so as to perform, in the time period Q4, the decelerated rotation at the maximum deceleration A0 from the point A to the position where the residual rotation amount Sr becomes 0, while taking into account the acceleration-change time T1. During a period when the spindle axis 12 performs the decelerated rotation, the spindle-axis control section 18 (the positioning-motion control section 38) executes only a position control for the spindle axis 12.

Figure 8:
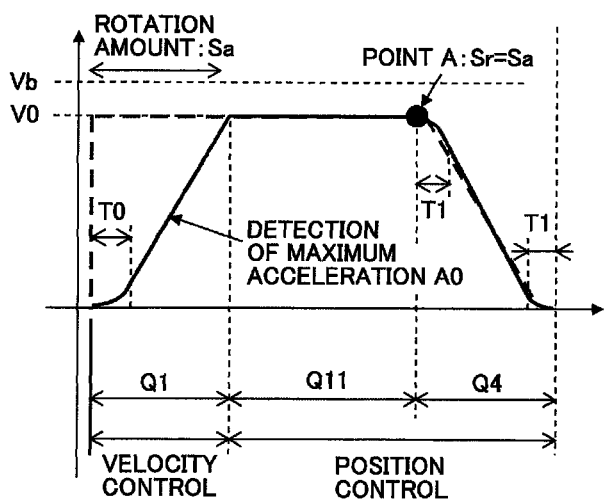
FIG. 8 is a diagram showing an yet further example of the cutting motion of the spindle axis.

FIG. 8 shows the motion of the spindle axis 12 by a speed-time curve, in the case where the current speed Vc reaches the maximum rotation speed V0 (<Vb) before the residual rotation amount Sr reaches one-half of the total rotation amount S0 (i.e., in the case where the judgment result at step S3 of FIG. 2 is No). As illustrated, the spindle axis 12 performs the motions in the time periods Q1 and Q4 shown in FIG. 4 and a motion corresponding to the motion in the time period Q5 shown in FIG. 4. More specifically, the spindle axis 12 performs, in the time period Q1, the accelerated rotation at the maximum acceleration A0, with the maximum rotation speed V0 set as a target value, while executing the torque-limiting over the predetermined time T0, and after reaching the maximum rotation speed V0, rotates in time period Q11 at the constant speed V0 until the point A when the residual rotation amount Sr becomes equal to the acceleration rotation amount Sa, and thereafter performs, in the time period Q4, the decelerated rotation at the maximum deceleration A0 from the point A to the position where the residual rotation amount Sr becomes 0, while taking into account the acceleration-change time T1. During a period when the spindle axis 12 performs the constant speed rotation and the decelerated rotation, the spindle-axis control section 18 (the positioning-motion control section 38) executes only a position control for the spindle axis 12.

Figure 9:
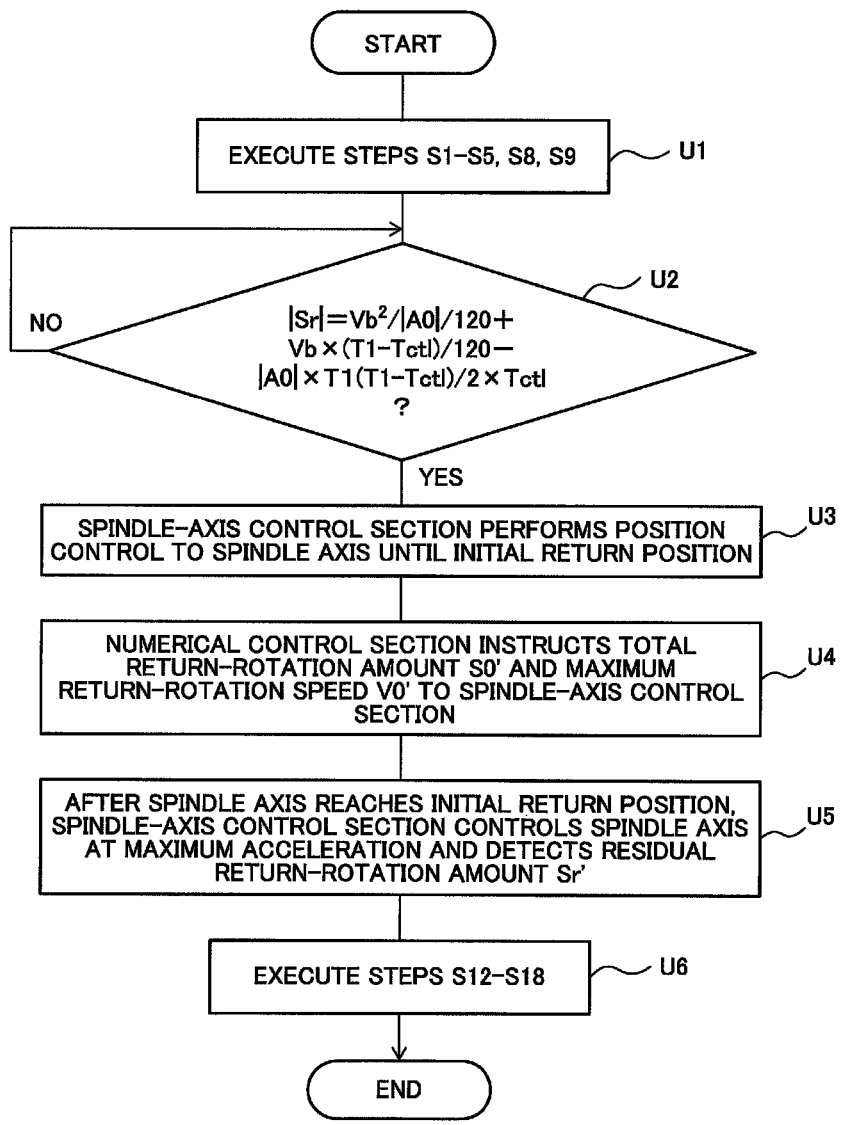
FIG. 9 is a flowchart for showing a cutting and return motion control method for a tapping process, which is another embodiment of a machine tool control method.
Figure 10:
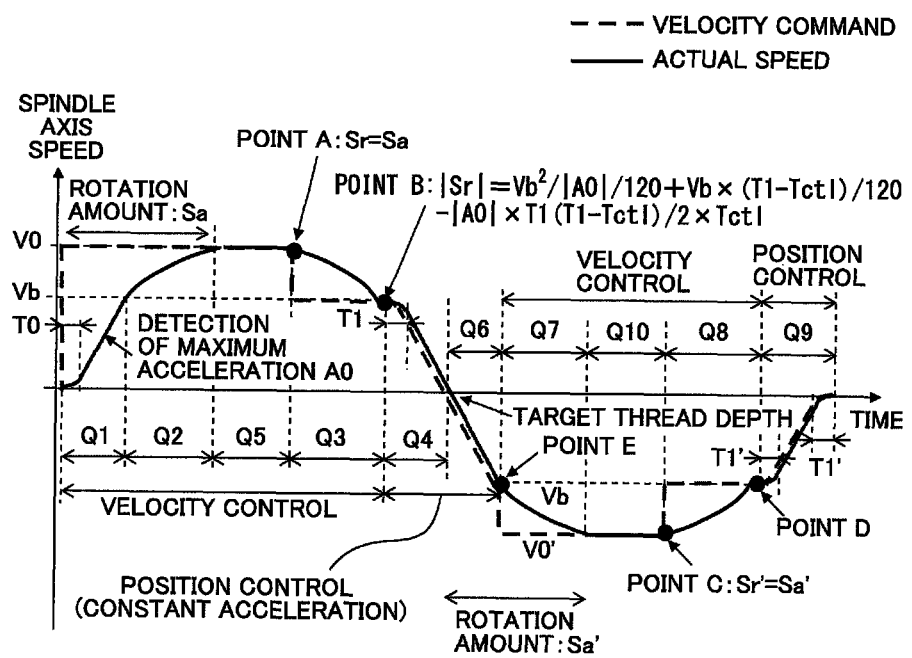
FIG. 10 is a diagram showing one example of the cutting and return motion of the spindle axis.

The controller 10 according to the embodiment shown in FIG. 1 is capable of executing a machine tool control method different from the aforementioned machine tool control method. FIG. 9 shows a cutting and return motion control method adapted to be performed for the spindle axis 12 in a tapping process, as the other embodiment of a machine tool control method executable by the controller 10. FIG. 10 shows one example of the cutting and return motion of the spindle axis 12 in the embodiment shown in FIG. 9. With reference to FIGS. 1, 2, 5, 9 and 10, the machine tool control method (the cutting and return motion control method in the tapping process) of another embodiment, as well as the configuration of the controller 10 executing this method, will be described below.

In summary, in the embodiment shown in FIGS. 9 and 10, the controller 10 executes several steps analogous to the steps in the cutting motion control method of the tapping process shown in FIG. 2, and thereby controls the cutting motion of the spindle axis 12, during a period when the spindle axis 12 is moved from the process start position (rotational position) to the target thread depth (rotational position). On the other hand, the spindle-axis control section 18 (the positioning-motion control section 38) of the controller 10 is configured not to make the spindle axis 12 stop at the target thread depth (i.e., not to set the acceleration to zero) at an instant when the spindle axis 12 reaches the target thread depth, but to make the spindle axis 12 perform an accelerated inverse rotation until a predetermined rotational position (hereinafter referred to as an initial return position) at the maximum acceleration A0' (negative value) of inverse rotation, which is equal to the maximum deceleration A0 (negative value) in the decelerated rotation at maximum capacity. After making the spindle axis 12 perform the accelerated inverse rotation until the initial return position, the controller 10 executes several steps analogous to the steps in the return motion control method of the tapping process shown in FIG. 5, and thereby controls the return motion of the spindle axis 12. The configuration of this embodiment will be described in detail below. However, the description of components corresponding to those in the flowcharts of FIGS. 2 and 5 will be omitted as appropriate.

As shown in FIG. 9, the controller 10 first executes, at step U1, the processes of steps S1 to S5, S8 and S9 shown in FIG. 2. More specifically, the numerical control section 16 (the spindle-axis command outputting section 26) instructs the total rotation amount S0 and the maximum rotation speed V0, of the spindle axis 12, to the spindle-axis control section 18 (step S1). The spindle-axis control section 18 (the initial-motion control section 30 and the torque-limit executing section 40) makes the spindle axis 12 perform the accelerated rotation at maximum capacity with the maximum rotation speed V0 set as a target speed, to perform the tapping process while executing the torque-limiting in the predetermined time T0 from the process start position, and simultaneously, the spindle-axis control section 18 (the maximum-acceleration detecting section 32 and the residual rotation-amount detecting section 34) detects the maximum acceleration A0 and the residual rotation amount Sr, of the spindle axis 12 (step S2). Thereafter, the spindle-axis control section 18 (the current-speed detecting section 36) sequentially detects the current speed Vc during the accelerated rotation at maximum capacity, and judges whether the current speed Vc has not reached the maximum rotation speed V0 (step S3). If Vc has not yet reached V0, the spindle-axis control section 18 judges whether the residual rotation amount Sr is equal to or less than one-half of the total rotation amount S0 (step S4). If Sr is equal to or less than one-half of S0, the spindle-axis control section 18 makes the spindle axis 12 perform the decelerated rotation at maximum capacity, so as to continuously perform the tapping process (or the cutting motion) (step S5). On the other hand, if it is judged that the current speed Vc has reached the maximum rotation speed V0 (step S3), the spindle-axis control section 18 stores a rotation amount of the spindle axis 12 from the process start position (i.e., a rotational position FBS) at an instant when the spindle axis reaches the maximum rotation speed V0, as the acceleration rotation amount Sa (step S8), and judges whether the residual rotation amount Sr is equal to or less than the acceleration rotation amount Sa (step S9). If Sr is equal to or less than Sa, the spindle-axis control section 18 makes the spindle axis 12 perform the decelerated rotation at maximum capacity, so as to continuously perform the cutting motion (step S5).

Referring now to FIG. 10, one example of the motion of the spindle axis 12, in the case where, during the cutting motion, the current speed Vc reaches the maximum rotation speed V0 before the residual rotation amount Sr reaches one-half of the total rotation amount S0 (i.e., in the case where the judgment result at step S3 in FIG. 2 is NO), is depicted by a speed-time curve. The motions of the spindle axis 12 in time periods Q1, Q2, Q5, Q3 and Q4 in the speed-time curve of FIG. 10 substantially correspond to the motions of the spindle axis 12 in time periods Q1, Q2, Q5, Q3 and Q4 in the aforementioned speed-time curve of FIG. 6. More specifically, as shown in FIG. 10, the accelerated rotation of the spindle axis 12 at maximum capacity (including the torque limiting time T0) is performed during the time periods Q1 and Q2, so that the current speed Vc of the spindle axis 12 reaches the maximum rotation speed V0; thereafter, the spindle axis 12 rotates at the constant speed V0 over the time period Q5 so as to continue the tapping process; then at the time point A when the residual rotation amount Sr becomes equal to the acceleration rotation amount Sa, the motion of the spindle axis 12 changes from the accelerated rotation to the decelerated rotation; thereafter, the decelerated rotation at maximum capacity of the spindle axis 12 is performed in the time period Q3; and thereafter, the position control for the spindle axis 12 is executed in the time period Q4.

With the controller 10 performs step U1 (especially, steps S1 to S2 to S3 to S8 to S9 to S5, in this order, in FIG. 2), the spindle axis 12 operates, in the time periods Q1, Q2, Q5 and Q3 shown in FIG. 10, in the same way as the operation in the time periods Q1, Q2, Q5 and Q3 shown in FIG. 6. In the motion example of FIG. 10, during the time period Q4 (i.e., the position control) after the time period Q3, the spindle-axis control section 18 (the positioning-motion control section 38) controls the cutting motion of the spindle axis 12 while taking into account the acceleration-change time T1 for gradually changing the acceleration as time passes. During this period, however, the acceleration-change time T1 is provided only for a time when the motion of the spindle axis 12 transitions from the constant speed Vb (i.e., null acceleration) in the very short time to the maximum deceleration A0 (i.e., just after the point B), which is different from the time period Q4 in the motion example of FIG. 6. In this acceleration-change time T1, the deceleration of the spindle axis 12 gradually increases from zero to the maximum deceleration A0 as time passes.

In the motion example of FIG. 10, the spindle-axis control section 18 (the positioning-motion control section 38) monitors the residual rotation amount Sr (rev) and the current speed Vc (min$^{-1}$), which are sequentially detected during the maximum deceleration control at step S5 in FIG. 2, and determines the position of a time point B, at which it is expected that the residual rotation amount Sr becomes equal to 0 (i.e., the spindle axis reaches the target thread depth) when the spindle axis is decelerated from the current speed Vc (min$^{-1}$) at the maximum deceleration A0 (negative value) corresponding to the maximum acceleration A0 (min$^{-1}$/s) while taking into account the acceleration-change time T1 (sec). The position of the point B is determined, as the absolute value of the residual rotation amount Sr (negative value) as seen from the point of Sr=0, by the following equation:

$$|Sr| = Vc^2/|A0|/120 + Vc \times (T1-Tctl)/120 - |A0| \times T1(T1-Tctl)/2 \times Tctl.$$

In this embodiment, it is premised that the spindle axis 12 is decelerated at the maximum deceleration A0 from the point B while taking into account the acceleration-change time T1 (sec). Accordingly, it is assumed that the current speed Vc of the spindle axis 12 has reached Vb at the point B. As a result, the position |Sr| of the point B can be determined, using the predetermined speed Vb, as:

$$|Sr| = Vb^2/|A0|/120 + Vb \times (T1-Tctl)/120 - |A0| \times T1(T1-Tctl)/2 \times Tctl.$$

Turning back to FIG. 9, at step U2, the spindle-axis control section 18 (the positioning-motion control section 38) judges whether the absolute value |Sr| of the residual rotation amount at the current position of the spindle axis 12 satisfies the equation:

$$|Sr| = Vb^2/|A0|/120 + Vb \times (T1-Tctl)/120 - |A0| \times T1(T1-Tctl)/2 \times Tctl$$

(hereinafter referred to as equation 3) (i.e., whether or not the rotational position of the spindle axis 12 has reached the point B). If the equation 3 is satisfied, the spindle-axis control section 18 (the positioning-motion control section 38) prepares, at step U3, a command for making the spindle axis 12 perform the decelerated rotation at the maximum deceleration A0 while taking into account the acceleration-change time T1 so as to reach the point of Sr=0 (i.e., the target thread depth) and subsequently perform the accelerated inverse rotation until the initial return position (i.e., time point E shown in FIG. 10) at the maximum acceleration A0' of inverse rotation, identical to the maximum deceleration A0 (i.e., A0=A0'), and executes a position control for the spindle axis 12 with use of the prepared command. If the equation 3 is not satisfied, the judgment at step U2 is repeated until the equation 3 is satisfied.

As shown in FIG. 10, the spindle axis 12 performs, in accordance with the command from the spindle-axis control section 18 (positioning-motion control section 38), the cutting motion from the point B toward the target thread depth, by performing the decelerated rotation, at the gradually changing deceleration lower than the maximum deceleration A0 during the acceleration-change time T1 while at maximum deceleration A0 during the time except for the acceleration-change time T1, and reaches the target thread depth when Sr becomes equal to 0 (in the time period Q4). At the moment the spindle axis 12 reaches the target thread depth, the current speed Vc of the spindle axis 12 becomes equal to zero, but the spindle axis 12 operates, in accordance with the command from the spindle-axis control section 18 (the positioning-motion control section 38), to maintain the maximum deceleration A0 and generate the maximum acceleration A0' of inverse rotation, and performs a return motion from the target thread depth toward the point E over time period Q6 by the accelerated inverse rotation for gradually increasing the current speed Vc (negative value). In this way, in the time period Q4 in which the spindle axis 12 operates from the point B to reach the target thread depth and in the time period Q6 in which the spindle axis operates from the target thread depth to reach the point E, the spindle-axis control section 18 executes a position control for the spindle axis 12 (step U3) and continuously moves the spindle axis 12 at the constant acceleration A0. Note that, although the current speed Vc of the spindle axis 12 becomes zero at the target thread depth, this is a momentary phenomenon, and thus should not be considered as to stop at the target thread depth.

The initial return position (point E) of the spindle axis 12 can be set arbitrarily. For example, as shown in FIG. 10, the point E may be set at a position at which the current speed Vc' of inverse rotation reaches the predetermined speed Vb, in the same way as the point B just before the start of the decelerated rotation of the spindle axis at the maximum deceleration A0 during the cutting motion. In this configuration, the position of the point E is considered as a position where the spindle axis reaches by performing the inverse rotation from the target thread depth by a rotation amount corresponding to $|Sr|=Vb^2/|A0|/120$. Strictly speaking, however, because of control characteristics, the maximum deceleration A0 (in the time period Q4) during the decelerated rotation at maximum capacity by the position control tends to be slightly suppressed in comparison to the maximum acceleration A0 (in the time period Q1) during the accelerated rotation at maximum capacity by the velocity control, and as a result, the maximum acceleration A0' of inverse rotation in the time period Q6 also tends to be slightly lowered in comparison to the maximum acceleration A0 in the time period Q1.

During a period when the spindle-axis control section 18 controls the rotational motion of the spindle axis 12 from the process start position to the target thread depth, the feed-axis control section 22 controls the feed axis 14 so as to perform a feed motion while following the motion of the spindle axis 12, with use of the rotational position FBS of the spindle axis 12. During a period when the spindle-axis control section 18 executes the processes from step U1 to step U3, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero). After it is judged that the tapping process has reached the target thread depth, the numerical control section 16 (the spindle-axis command outputting section 26) obtains, at step U4 and concurrently with step U3, the total return-rotation amount S0' and the maximum return-rotation speed V0', of the spindle axis 12, during a period when the spindle axis operates from the target thread depth to the return completion position, from a command value provided in the tapping program P interpreted by the program interpreting section 24, and sends the total return-rotation amount S0' and the maximum return-rotation speed V0' as the spindle axis command CS to the spindle-axis control section 18.

After the spindle axis 12 has reached the initial return position (point E), the spindle-axis control section 18 (the initial-motion control section 30) makes the spindle axis 12 perform an accelerated inverse rotation at maximum capacity using the maximum permissible current of the drive source, from the initial return position (point E) toward the return completion position, with the maximum return-rotation speed V0' set as a target speed, so as to perform the return motion. The spindle-axis control section 18 (the residual rotation-amount detecting section 34) sequentially detects a residual return-rotation amount Sr' of the spindle axis 12 during a period when the spindle axis operates from a current position to the return completion position, based on the total return-rotation amount S0' and the rotational position FBS. The spindle-axis control section 18 notifies the detected residual return-rotation amount Sr' to the numerical control section 16 every time it is detected. In this embodiment, the maximum-acceleration detecting section 32 does not detect a maximum acceleration of inverse rotation of the spindle axis 12 during the time period Q6, but obtains the maximum deceleration A0 in the decelerated rotation at maximum capacity during the time period Q4 as the maximum acceleration A0' of inverse rotation of the spindle axis 12 performing the accelerated inverse rotation from the target thread depth.

Next, the controller 10 executes, at step U6, the processes of steps S12 to S18 shown in FIG. 5. More specifically, the spindle-axis control section 18 (the current-speed detecting section 36) sequentially detects the current speed Vc' of inverse rotation based on the rotational position FBS during the accelerated inverse rotation at maximum capacity, and judges whether the current speed Vc' has not reached the maximum return-rotation speed V0' (step S12). If Vc' has not reached V0', the spindle-axis control section 18 judges whether the residual return-rotation amount Sr' is equal to or less than one-half of the total return-rotation amount S0' (step S13). If Sr' is equal to or less than one-half of S0', the spindle-axis control section 18 makes the spindle axis 12 perform the decelerated inverse rotation at maximum capacity using the maximum permissible current of the drive source, so as to continuously perform the return motion (step S14). On the other hand, if it is judged that the current speed Vc' has reached the maximum return-rotation speed V0' (step S12), the spindle-axis control section 18 stores a rotation amount of the spindle axis 12 from the target thread depth (i.e., a rotational position FBS) at an instant when the spindle axis reaches the maximum return-rotation speed V0', as the acceleration rotation amount Sa' of the return motion (step S17), and judges whether the residual return-rotation amount Sr' is equal to or less than the acceleration rotation amount Sa' (step S18). If Sr' is equal to or less than Sa', the spindle-axis control section 18 makes the spindle axis 12 perform the decelerated inverse rotation at maximum capacity, so as to continuously perform the return motion (step S14).

Next, the spindle-axis control section 18 (the positioning-motion control section 38) judges whether the absolute value |Sr'| of the residual return-rotation amount Sr' at the current position of the spindle axis 12 satisfies the equation: $|Sr'|=Vb^2/|A0'|/120+Vb \times (T1'-Tctl)/120$ (equation 2) (i.e., whether or not the rotational position of the spindle axis 12 has reached the point D (FIG. 10)) (step S15). If the equation 2 is satisfied, the spindle-axis control section 18 (the positioning-motion control section 38) prepares the command for making the spindle axis 12 perform the decelerated inverse rotation at the maximum deceleration A0' while taking into account the acceleration-change time T1' and stop at the point of Sr'=0 (i.e., the return completion position), and executes the position control for the spindle axis 12 with use of the prepared command (step S16). The spindle axis 12 performs, in accordance with the command from the spindle-axis control section 18 (the positioning-motion control section 38), the return motion from the point D toward the return completion position, by performing the decelerated inverse rotation, at the gradually changing deceleration lower than the maximum deceleration A0' during the acceleration-change time T1' while at the maximum deceleration A0' during the time except for the acceleration-change time T1', and stops at the return completion position when Sr' becomes equal to 0.

With the controller 10 performs step U6 (especially, steps S12 to S17 to S18 to S14 to S15 to S16, in this order, in FIG. 5), the spindle axis 12 operates, in the time periods Q7, Q10, Q8 and Q9 shown in FIG. 10, in the same way as the operation in the time periods Q7, Q10, Q8 and Q9 shown in FIG. 6. In the motion example of FIG. 10, since the current speed of inverse rotation of the spindle axis 12 exceeds Vb (negative value) after reaching the initial return position (point E), the acceleration of inverse rotation of the spindle axis 12 gradually decreases from A0' during the accelerated inverse rotation at maximum capacity in the time period Q7. The current speed Vc' of the spindle axis 12 reaches the maximum return-rotation speed V0' before the residual return-rotation amount Sr' reaches one-half of the total return-rotation amount S0'; thereafter, the spindle axis 12 inversely rotates at the constant speed V0' over the time period Q10 so as to continue the return motion; then at the time point C when the residual return-rotation amount Sr' becomes equal to the acceleration rotation amount Sa', the motion of the spindle axis 12 changes from the accelerated inverse rotation to the decelerated inverse rotation; thereafter, the decelerated inverse rotation at maximum capacity of the spindle axis 12 is performed in the time period Q8; and thereafter, the position control for the spindle axis 12, which takes into account the acceleration-change time T1', is executed in the time period Q9.

In the motion example of FIG. 10, the spindle-axis control section 18 (the positioning-motion control section 38) controls, after the time period Q8 (i.e., the velocity control), the return motion of the spindle axis 12 while taking into account the acceleration-change time T1' for gradually changing the acceleration as time passes. The motion example of FIG. 6 has a configuration wherein, in the time period Q9 after the time period Q8, the acceleration-change time T1' is provided for a time (just after the point D) when the motion of the spindle axis 12 transitions from the constant speed Vb (i.e., null acceleration) in the very short time to a maximum deceleration A0' (that corresponds to the maximum acceleration A0' of inverse rotation in the time period Q6), and the deceleration of the spindle axis 12 gradually increases from zero to the maximum deceleration A0' as time passes in the acceleration-change time T1'. The motion example of FIG. 10 also has a configuration wherein, in the time period Q9 after the time period Q8, the other or second acceleration-change time T1' is provided for a time when the motion of the spindle axis 12 transitions from the maximum deceleration A0' to the stoppage at the return completion position (i.e., null acceleration), and the deceleration of the spindle axis 12 gradually decreases from the maximum deceleration A0' to zero as time passes in the second acceleration-change time T1'.

During a period when the spindle-axis control section 18 controls the inverse rotational motion of the spindle axis 12 from the target thread depth to the return completion position, the feed-axis control section 22 controls the feed axis 14 so as to perform an inverse feed motion while following the motion of the spindle axis 12, with use of the rotational position FBS of the spindle axis 12. During a period when the spindle-axis control section 18 executes the processes from step U4 to step U6, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

The machine tool control method according to the embodiment shown in FIGS. 9 and 10 has a configuration wherein, when the spindle axis 12 is made perform the return motion from the target thread depth to the return completion position, the spindle axis 12 is first not made stop at the target thread depth (i.e., the acceleration is not set to zero) at the completion of the cutting motion, but is made perform the accelerated inverse rotation until the predetermined initial return position at the maximum acceleration A0' (negative value) of inverse rotation, which is equal to the maximum deceleration A0 (negative value). According to this configuration, the acceleration of the spindle axis 12 is not changed at an instant when the operation of the spindle axis 12 is changed from the cutting motion to the return motion, so that it is possible to avoid a mechanical or structural shock that may be caused on the spindle axis 12 due to the change in the acceleration as well as increase of the synchronized error that may be caused between the spindle axis 12 and the feed axis 14 due to the change in the acceleration. Accordingly, in this embodiment, it is no longer necessary to provide the acceleration-change time T1 just before the stoppage at the target thread depth and the torque limiting time T0 just after the start from the target thread depth, which are adopted in the motion example shown in FIG. 6.

In the embodiment shown in FIG. 9, the equation 3 used for determining the position |Sr|(rev) of the point B for the spindle axis 12 includes the third term |A0|×T1(T1−Tctl)/ 2×Tctl in the right side, which expresses a value resulting from the fact that an acceleration-change time T1 just before the stoppage at the target thread depth is left out of account, and which corresponds to a difference from the configuration (FIG. 6: equation 1) wherein the acceleration-change time T1 just before the stoppage at the target thread depth is took into account. If, in the embodiment of FIG. 9, the position |Sr| of the point B is determined by the equation 1 without considering the above difference, the motion of the spindle axis 12 is going to change from the decelerated rotation (the cutting motion) to the accelerated inverse rotation (the return motion) at a position short of the target thread depth by a rotation number corresponding to the above difference. In an actual tapping process, when an unprocessed portion generated correspondingly to the above difference is deemed to have no problem in terms of the accuracy or quality of an internal thread to be processed, the embodiment of FIG. 9 may be configured to determine the position |Sr| of the point B by using the equation 1. In this configuration, the unprocessed portion corresponding to the above difference may be reduced by bringing T1 close to Tctl in the equation 1.

Figure 11:
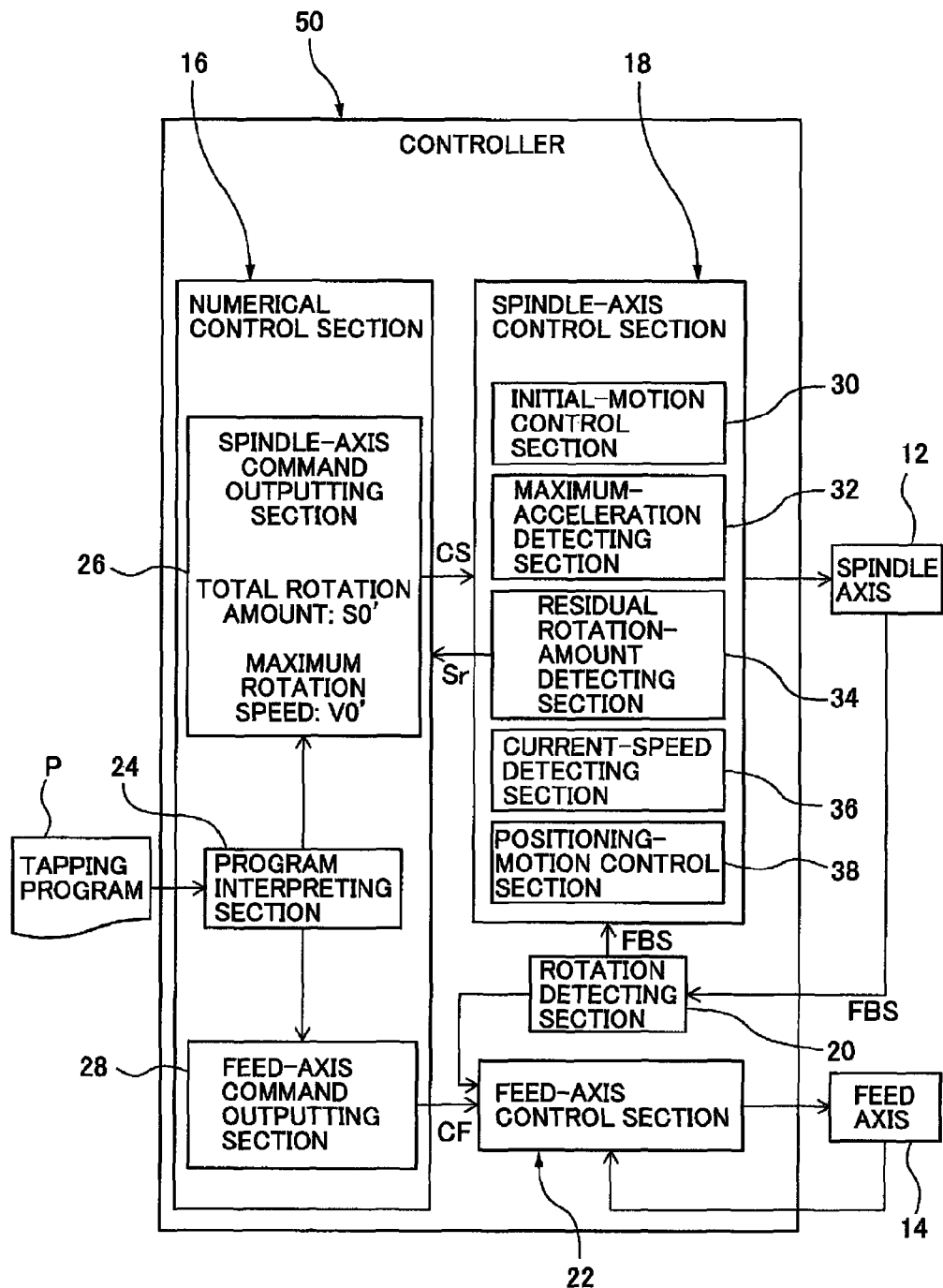
FIG. 11 is a functional block diagram showing a configuration of a second embodiment of a machine tool controller.

A controller according to the present invention may have a configuration wherein, in the motion examples shown in, e.g., FIGS. 6 and 10, only the acceleration-change time T1' in the time period Q9 is took into account (i.e., the torque limiting time T0 in the time period Q1, the acceleration-change time T1 in the time period Q4 and the torque limiting time T0' in the time period Q6 are left out of account). FIG. 11 is a functional block diagram showing a configuration of a controller 50 of a machine tool, according to the second embodiment having such an alternative configuration. The configuration of the controller 50 is substantially identical to the configuration of the controller 10 shown in FIG. 1, except that the torque-limit executing section 40 is not provided, and therefore, mutually corresponding components are denoted by the same reference numerals and the detailed descriptions thereof are not repeated.

The controller 50 is a controller of a machine tool, configured to control a synchronized operation of a spindle axis 12 and a feed axis 14, and includes a numerical control section 16 configured to prepare a spindle-axis command CS and a feed-axis command CF based on a tapping program P; a spindle-axis control section 18 configured to control a rotational motion of the spindle axis 12 in accordance with the spindle-axis command CS; a rotation detecting section 20 configured to detect a rotational position FBS of the spindle axis 12; and a feed-axis control section 22 configured to control a feed motion of the feed axis 14 in accordance with the feed-axis command CF, based on the rotational position FBS. The numerical control section 16 includes a spindle-axis command outputting section 26 configured to obtain, from the tapping program P, a total return-rotation amount S0' and a maximum return-rotation speed V0', of the spindle axis 12, during a period when the spindle axis operates from a target thread depth to a return completion position, and to send the total return-rotation amount S0' and the maximum return-rotation speed V0' as the spindle-axis command CS to the spindle-axis control section 18.

The spindle-axis control section 18 includes an initial-motion control section 30 configured to make the spindle axis 12 perform an accelerated inverse rotation at maximum capacity, from the target thread depth (corresponding to the motion example of FIG. 6), or from an initial return position at which the spindle axis has returned by a predetermined rotation number from the target thread depth (corresponding to the motion example of FIG. 10), toward the return completion position, with the maximum return-rotation speed V0' set as a target value; a maximum-acceleration detecting section 32 configured to detect or obtain a maximum acceleration A0' of inverse rotation during a period when the spindle axis 12 performs the accelerated inverse rotation from the target thread depth; a residual rotation-amount detecting section 34 configured to detect a residual return-rotation amount Sr' of the spindle axis 12 during a period when the spindle axis operates from a current position to the return completion position, based on the total return-rotation amount S0' and the rotational position FBS; a current-speed detecting section 36 configured to detect a current speed Vc' of inverse rotation of the spindle axis 12 based on the rotational position FBS; and a positioning-motion control section 38 configured to make the spindle axis 12 perform a decelerated inverse rotation at an acceleration lower than the maximum acceleration A0' of inverse rotation and changing at a predetermined rate (A0'/T1') during a predetermined acceleration-change time T1', and also perform a decelerated inverse rotation at maximum capacity during a time except for the acceleration-change time T1', so as to make the spindle axis 12 stop at the return completion position, after the accelerated inverse rotation at maximum capacity, based on the maximum acceleration A0' of inverse rotation, the residual return-rotation amount Sr', the current speed Vc' of inverse rotation and the acceleration-change time T1'.

The controller 50 according to the above embodiment has a configuration wherein, when the spindle axis 12 is made to perform the return motion from the target thread depth to the return completion position, the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by accelerating the spindle axis 12 with the maximum power using the maximum permissible current, aiming at the maximum return-rotation speed V0', and continuously performs, based on the maximum acceleration A0' during the accelerating step and the residual return-rotation amount Sr' and the current speed Vc' of the spindle axis 12, the return motion until the return completion position in the shortest time while decelerating the spindle axis 12 at the maximum deceleration A0' so as to make the spindle axis stop at the return complete position. Therefore, according to the controller 50, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Moreover, the controller 50 has a configuration wherein, when the spindle axis 12 is made to perform the decelerated inverse rotation at maximum capacity, a position control for the spindle axis 12 is executed while taking into account the acceleration-change time T1', and therefore it is possible for the spindle axis 12 to start at a sufficiently lower (e.g., null) deceleration relative to the maximum deceleration A0' and thereafter gradually increase the deceleration so as to perform the decelerated inverse rotation at the maximum deceleration A0' at the instant when the acceleration-change time T1' has elapsed. Therefore, according to the controller 50, it is possible to prevent the deceleration of the spindle axis 12 from rapidly changing during the decelerated inverse rotation (at the point D in FIGS. 6 and 10) or at the stoppage at the return completion position, so that it is possible to reduce a mechanical or structural shock that may be caused on the spindle axis 12 due to the change in the deceleration, and also to reduce a synchronization error that may be caused between the spindle axis 12 and the feed axis 14 due to the change in the deceleration. Note that, the acceleration-change time T1' may be provided for at least one of a time just after the point D and a time just before the return completion position.

The configuration of the controller 50 of the above embodiment can be described as a machine tool control method for controlling a synchronized operation of the spindle axis 12 and the feed axis 14. This control method includes the acts, executed by the controller 50, of obtaining, from a tapping program P, a total return-rotation amount S0' and a maximum return-rotation speed V0' of the spindle axis 12 during a period when the spindle axis operates from a target thread depth to a return completion position; making the spindle axis 12 perform an accelerated inverse rotation at maximum capacity, from the target thread depth, or from an initial return position at which the spindle axis has returned by a predetermined rotation number from the target thread depth, toward the return completion position, with the maximum return-rotation speed V0' set as a target value; detecting or obtaining a maximum acceleration A0' of inverse rotation during a period when the spindle axis 12 performs the accelerated inverse rotation from the target thread depth; detecting a residual return-rotation amount Sr' of the spindle axis 12 during a period when the spindle axis operates from a current position to the return completion position, based on the total return-rotation amount S0' and a rotational position feedback FBS of the spindle axis 12; detecting a current speed Vc' of inverse rotation of the spindle axis 12 based on the rotational position feedback FBS; and making the spindle axis 12 perform a decelerated inverse rotation at an acceleration lower than the maximum acceleration A0' of inverse rotation and changing at a predetermined rate A0'/T1' during a predetermined acceleration-change time T1', and also perform a decelerated inverse rotation at maximum capacity during a time except for the acceleration-change time T1', so as to make the spindle axis 12 stop at the return completion position, after the accelerated inverse rotation at maximum capacity, based on the maximum acceleration A0' of inverse rotation, the residual return-rotation amount Sr', the current speed Vc' of inverse rotation and the acceleration-change time T1'.

Figure 12:
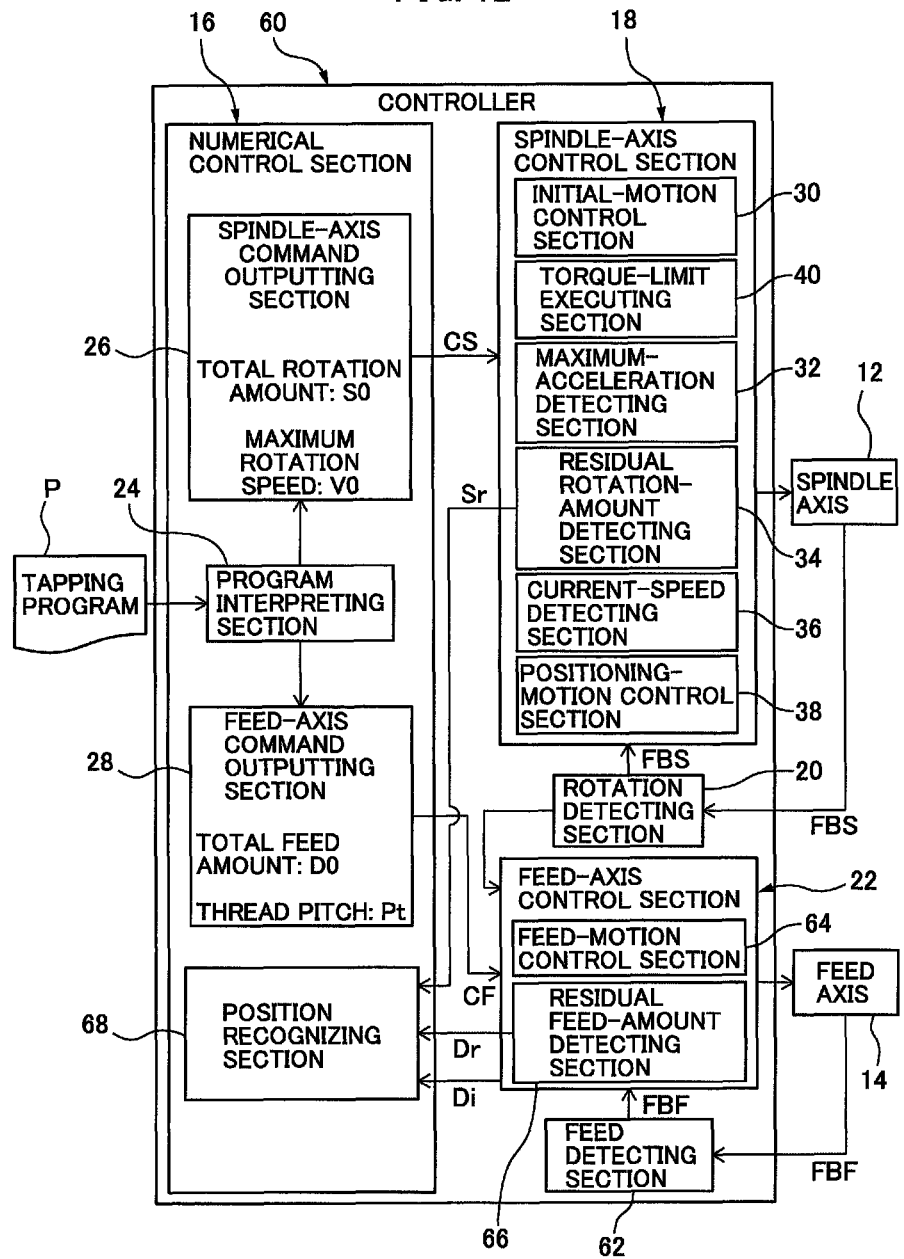
FIG. 12 is a functional block diagram showing the configuration of a modified example of the controller of FIG. 1.

In a tapping process using a machine tool, it is preferable that a controller continuously grasps a rotational position of a spindle axis and a feed position of a feed axis during the tapping process. FIG. 12 is a functional block diagram showing a configuration of a controller 60 according to a modified example, in which a function of recognizing the positions of the spindle axis and the feed axis is added. The configuration of the controller 60 is substantially identical to the configuration of the controller 10 in FIG. 1, except that the position recognizing function is added, and therefore, mutually corresponding components are denoted by the same reference numerals and the detailed descriptions thereof are not repeated.

The controller 60 includes a numerical control section 16 configured to prepare a spindle-axis command CS and a feed-axis command CF based on a tapping program P; a spindle-axis control section 18 configured to control a rotational motion of a spindle axis 12 in accordance with the spindle-axis command CS; a rotation detecting section 20 configured to detect a rotational position of the spindle axis 12; a feed-axis control section 22 configured to control a feed motion of a feed axis 14 in accordance with the feed-axis command CF, based on the rotational position detected by the rotation detecting section 20; and a feed detecting section 62 configured to detect the feed position of the feed axis 14. A feed-axis command outputting section 28 of the numerical control section 16 obtains, before starting a tapping process, a total feed amount D0 (mm) and a thread pitch Pt (mm/rev), of the feed axis 14 during a period when the feed axis operates from a process start position to a target thread depth, from a command value provided in the tapping program P interpreted by a program interpreting section 24, and sends the total feed amount D0 and the thread pitch Pt as the feed-axis command CF to the feed-axis control section 22. In this way, the feed-axis command CF does not include a position command and/or an acceleration/deceleration command, which makes the feed axis 14 perform a feed motion until the target thread depth.

The feed-axis control section 22 includes a feed-motion control section 64 configured to control the feed motion of the feed axis 14, based on the rotational position FBS of the spindle axis 12 detected by the rotation detecting section 20, the thread pitch Pt and the feed position FBF (i.e., a feedback value) of the feed axis 14 detected by the feed detecting section 62; and a residual feed-amount detecting section 66 configured to detect a residual feed amount Dr of the feed axis 14 during a period when the feed axis operates from the current position to the target thread depth, based on the total feed amount D0 and the feed position FBF. The feed detecting section 62 can obtain the feed position FBF from the output of a position detector (not shown), such as an encoder, etc., for detecting the operating position of the drive unit of the feed axis 14.

The residual rotation-amount detecting section 34 of the spindle-axis control section 18 sequentially detects the residual rotation amount Sr of the spindle axis 12 from the current position during a period when the spindle axis 12 is made to perform a cutting motion from the process start position to the target thread depth, and notifies the residual rotation amount Sr to the numerical control section 16 every time it is detected. The residual feed-amount detecting section 66 of the feed-axis control section 22 sequentially detects the residual feed amount Dr of the feed axis 14 from the current position during a period when the feed axis 14 is made to perform a feed motion from the process start position to the target thread depth, and notifies the residual feed amount Dr to the numerical control section 16 every time it is detected. Further, the feed-axis control section 22 notifies an initial position Di (feed position FBF) of the feed axis 14 at the start of processing to the numerical control section 16.

The numerical control section 16 includes a position recognizing section 68 configured to recognize the current position of the spindle axis 12 based on the residual rotation amount Sr, and also recognize the current position of the feed axis 14 based on the residual feed amount Dr. The position recognizing section 68 recognizes the current position of the spindle axis 12 as (S0−Sr) with use of the total rotation amount S0 of the spindle axis 12 obtained from the tapping program P and the residual rotation amount Sr of the spindle axis 12 notified from the spindle-axis control section 18. The position recognizing section 68 also recognizes the current position of the feed axis 14 as (D0−Dr+Di) with use of the total feed amount D0 of the feed axis 14 obtained from the tapping program P and the residual feed amount Dr and initial position Di of the feed axis 14 notified from the feed-axis control section 22.

In the controller 60 having the above configuration, the position recognizing section 68 of the numerical control section 16 is capable of recognizing the current positions of the spindle axis 14 and feed axis 14, even in the configuration wherein the spindle-axis command CS prepared by the numerical control section 16 does not include either a position command or an acceleration/deceleration command for the spindle axis 12 and the feed-axis command CF prepared by the numerical control section 16 does not include either a position command or an acceleration/deceleration command for the feed axis 14. Therefore, according to the controller 60, the numerical control section 16, as a higher-level controller relative to the spindle-axis control section 18 and the feed-axis control section 22 that perform a feedback control, is capable of constantly grasping or managing the operating states of the spindle axis 12 and feed axis 14 during execution of the tapping process, and thereby it is possible to improve the reliability of a tapping process control.

In the controller 60, during a period when a return motion of the tapping process is controlled, the position recognizing section 68 of the numerical control section 16 is also capable of recognizing the current positions of the spindle axis 12 and the feed axis 14 in an analogous manner. In this configuration, at the instant when the numerical control section 16 judges that the tapping process has reached the target thread depth, the feed-axis command outputting section 28 obtains a total return-feed amount D0' (mm) and a thread pitch Pt (mm/rev), of the feed axis 14 during a period when the feed axis operates from the target thread depth to a return completion position, from a command value provided in the tapping program P interpreted by the program interpreting section 24, and sends the total return-feed amount D0' and the thread pitch Pt as the feed axis command CF to the feed-axis control section 22. Usually, the total return-feed amount D0' is identical to the total feed amount D0.

The feed-motion control section 64 of the feed-axis control section 22 controls a return-feed motion of the feed axis 14, based on the rotational position FBS of return motion of the spindle axis 12, the thread pitch Pt and the feed position FBF of return motion of the feed axis 14. The residual feed-amount detecting section 66 of the feed-axis control section 22 detects a residual return-feed amount Dr' of the feed axis 14 during a period when the feed axis operates from the current position to the return completion position, based on the total return-feed amount D0' and the feed position FBF. The residual rotation-amount detecting section 34 of the spindle-axis control section 18 sequentially detects the residual return-rotation amount Sr' of the spindle axis 12 from the current position during a period when the spindle axis 12 is made to perform a return motion from the target thread depth to the return completion position, and notifies the residual return-rotation amount Sr' to the numerical control section 16 every time it is detected. The residual feed-amount detecting section 66 of the feed-axis control section 22 sequentially detects the residual return-feed amount Dr' of the feed axis 14 from the current position during a period when the feed axis 14 is made to perform a return-feed motion from the target thread depth to the return completion position, and notifies the residual return-feed amount Dr' to the numerical control section 16 every time it is detected. Further, the feed-axis control section 22 notifies an initial position Di' (feed position FBF) of the feed axis 14 at the start of return motion to the numerical control section 16. The position recognizing section 68 of the numerical control section 16 recognizes the current position (S0'−Sr') of the spindle axis 12 with use of the total return-rotation amount S0' and residual return-rotation amount Sr' of the spindle axis 12, and also recognizes the current position (D0'−Dr'+Di') of the feed axis 14 with use of the total return-feed amount D0', residual return-feed amount Dr' and initial position Di' of the feed axis 14.

Figure 13:
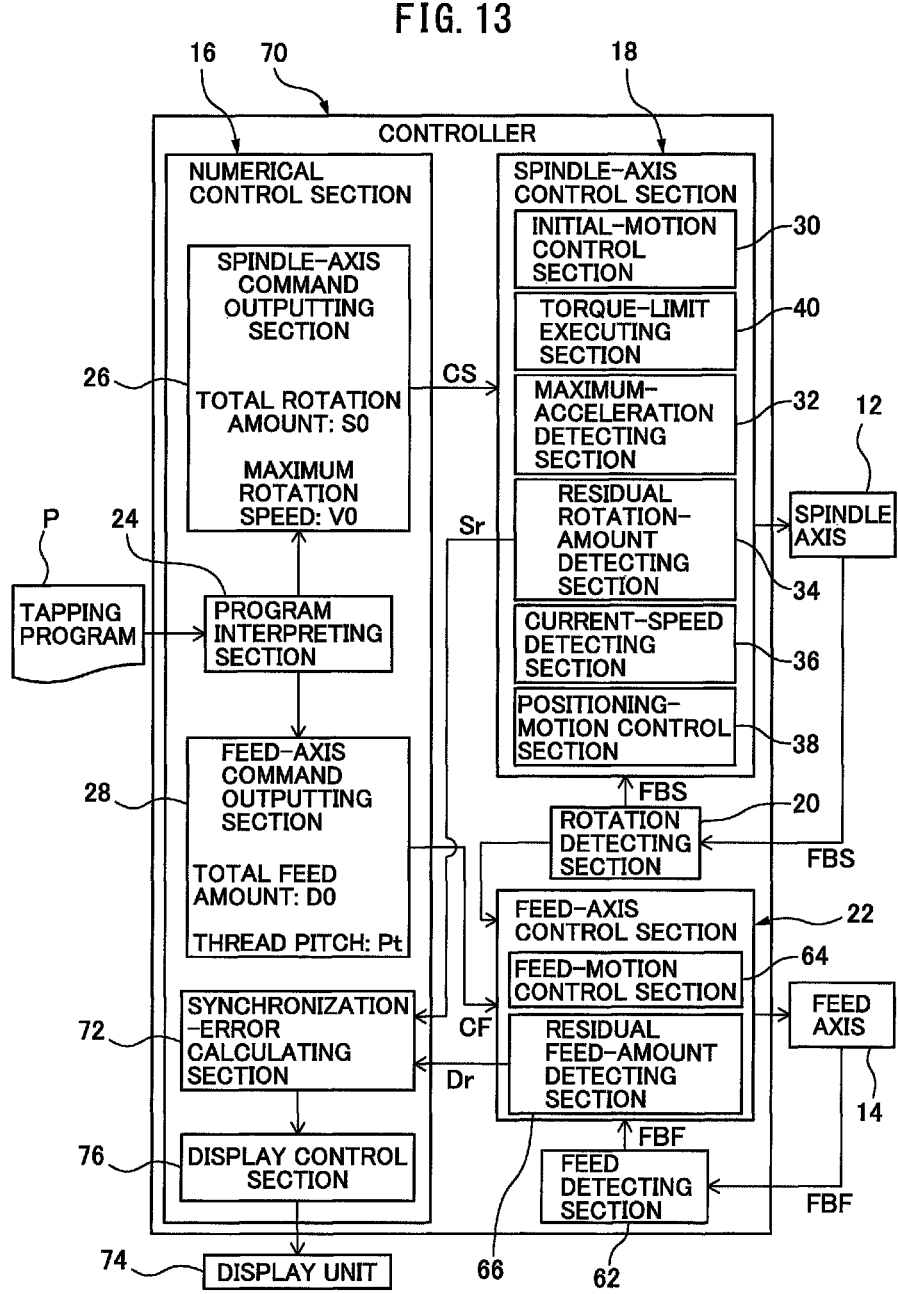
FIG. 13 is a functional block diagram showing the configuration of another modified example of the controller of FIG. 1.

In a tapping process using a machine tool, it is preferable that a controller continuously grasps a synchronization error between a spindle axis and a feed axis during the tapping process. FIG. 13 is a functional block diagram showing a configuration of a controller 70 according to a modified example, in which a function of recognizing the synchronization error between the spindle axis and the feed axis is added. The configuration of the controller 70 is substantially identical to the configuration of the controller 10 in FIG. 1, except that the synchronization error recognizing function is added, and therefore, mutually corresponding components are denoted by the same reference numerals and the detailed descriptions thereof are not repeated.

The controller 70 includes a numerical control section 16 configured to prepare a spindle-axis command CS and a feed-axis command CF based on a tapping program P; a spindle-axis control section 18 configured to control a rotational motion of the spindle axis 12 in accordance with the spindle-axis command CS; a rotation detecting section 20 configured to detect a rotational position of the spindle axis 12; a feed-axis control section 22 configured to control a feed motion of the feed axis 14 in accordance with the feed-axis command CF, based on the rotational position detected by the rotation detecting section 20; and a feed detecting section 62 configured to detect the feed position of the feed axis 14. A feed-axis command outputting section 28 of the numerical control section 16 obtains, before starting a tapping process, a total feed amount D0 (mm) and a thread pitch Pt (mm/rev), of the feed axis 14 during a period when the feed axis operates from a process start position to a target thread depth, from a command value provided in the tapping program P interpreted by a program interpreting section 24, and sends the total feed amount D0 and the thread pitch Pt as the feed-axis command CF to the feed axis control section 22. In this way, the feed-axis command CF does not include a position command and/or an acceleration/deceleration command, which makes the feed axis 14 perform a feed motion until the target thread depth.

The feed-axis control section 22 includes a feed-motion control section 64 configured to control the feed motion of the feed axis 14, based on the rotational position FBS of the spindle axis 12 detected by the rotation detecting section 20, the thread pitch Pt and the feed position FBF of the feed axis 14 detected by the feed detecting section 62; and a residual feed-amount detecting section 66 configured to detect a residual feed amount Dr of the feed axis 14 during a period when the feed axis operates from the current position to the target thread depth, based on the total feed amount D0 and the feed position FBF. The residual rotation-amount detecting section 34 of the spindle-axis control section 18 sequentially detects the residual rotation amount Sr of the spindle axis 12 from the current position during a period when the spindle axis 12 is made to perform a cutting motion from the process start position to the target thread depth, and notifies the residual rotation amount Sr to the numerical control section 16 every time it is detected. The residual feed-amount detecting section 66 of the feed-axis control section 22 sequentially detects the residual feed amount Dr of the feed axis 14 from the current position during a period when the feed axis 14 is made to perform a feed motion from the process start position to the target thread depth, and notifies the residual feed amount Dr to the numerical control section 16 every time it is detected.

The numerical control section 16 includes a synchronization-error calculating section 72 configured to calculate a synchronization error in the synchronized operation of the spindle axis 12 and the feed axis 14, based on the residual rotation amount Sr, the residual feed amount Dr and the thread pitch Pt. The synchronization-error calculating section 72 calculates the synchronization error E between the spindle axis 12 and the feed axis 14 by the following equation, with use of the residual rotation amount Sr (rev) of the spindle axis 12 notified from the spindle-axis control section 18, the residual feed amount Dr (mm) of the feed axis 14 notified from the feed axis control section 22 and the thread pitch Pt (mm/rev).

In a case where the synchronization error E is calculated in terms of the rotation amount of the spindle axis 12:

$$E(\text{rev}) = Sr - Dr/Pt$$

In a case where the synchronization error E is calculated in terms of the feed amount of the feed axis 14:

$$E(\text{mm}) = Sr \times Pt - Dr$$

In the controller 70 having the above configuration, the synchronization error calculating section 72 of numerical control section 16 is capable of determining the synchronization error E between the spindle axis 12 and the feed axis 14, even in the configuration wherein the numerical control section 16 does not perform a feedback control for the spindle axis 12 and the feed axis 14. Therefore, according to the controller 70, the numerical control section 16, as a higher-level controller relative to the spindle-axis control section 18 and feed-axis control section 22 that perform a feedback control, is capable of constantly grasping or managing the synchronization error E between the spindle axis 12 and the feed axis 14 during execution of the tapping process, and thereby it is possible to improve the reliability of a tapping process control.

The numerical control section 16 of the controller 70 may include a display controlling section 76 configured to make a display unit 74 display the synchronization error E determined by the synchronization-error calculating section 72. According to this configuration, it is possible for an operator to sequentially check the synchronization error E, and therefore to quickly take measure in consideration of the synchronization error E.

In the controller 70, during a period when a return motion of the tapping process is controlled, the synchronization-error calculating section 72 of the numerical control section 16 is also capable of calculating the synchronization error E between the spindle axis 12 and the feed axis 14 in an analogous manner. In this configuration, at an instant when the numerical control section 16 judges that the tapping process has reached the target thread depth, the feed-axis command outputting section 28 obtains a total return-feed amount D0' (mm) and a thread pitch Pt (mm/rev), of the feed axis 14 during a period when the feed axis operates from the target thread depth to a return completion position, from a command value provided in the tapping program P interpreted by the program interpreting section 24, and sends the total return-feed amount D0' and the thread pitch Pt as the feed axis command CF to the feed-axis control section 22. Usually, the total return-feed amount D0' is identical to the total feed amount D0.

The feed-motion control section 64 of the feed-axis control section 22 controls a return-feed motion of the feed axis 14, based on the rotational position FBS of return motion of the spindle axis 12, the thread pitch Pt and the feed position FBF of return motion of the feed axis 14. The residual feed-amount detecting section 66 of the feed-axis control section 22 detects a residual return-feed amount Dr' of the feed axis 14 during a period when the feed axis operates from the current position to the return completion position, based on the total return-feed amount D0' and the feed position FBF. The residual rotation-amount detecting section 34 of the spindle-axis control section 18 sequentially detects the residual return-rotation amount Sr' of the spindle axis 12 from the current position during a period when the spindle axis 12 is made to perform a return motion from the target thread depth to the return completion position, and notifies the residual return-rotation amount Sr' to the numerical control section 16 every time it is detected. The residual feed-amount detecting section 66 of the feed-axis control section 22 sequentially detects the residual return-feed amount Dr' of the feed axis 14 from the current position during a period when the feed axis 14 is made to perform a return-feed motion from the target thread depth to the return completion position, and notifies the residual return-feed amount Dr' to the numerical control section 16 every time it is detected. The synchronization error calculating section 72 of the numerical control section 16 calculates, with use of the residual return-rotation amount Sr' of the spindle axis 12, the residual return-feed amount Dr' of the feed axis 14 and the thread pitch Pt, the synchronization error E between the spindle axis 12 and the feed axis 14 (E=Sr'−Dr'/Pt or E=Sr'×Pt−Dr').

The position recognizing function in the controller 60 according to the aforementioned modified example (FIG. 12) and the synchronization error recognizing function in the controller 70 according to the aforementioned modified example (FIG. 13) may be adopted in the controller 50 shown in FIG. 11.

While the invention has been described with reference to specific embodiments, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller being configured to:
   prepare a spindle-axis command and a feed-axis command based on a tapping program;
   control a rotational motion of the spindle axis in accordance with the spindle-axis command;
   detect a rotational position of the spindle axis; and
   control a feed motion of the feed axis in accordance with the feed-axis command, based on the rotational position;
   obtain, from the tapping program, a total rotation amount and a maximum rotation speed of the spindle axis during a period when the spindle axis operates from a process start position to a target thread depth, and to send the total rotation amount and the maximum rotation speed as the spindle-axis command to the spindle-axis control section;
   make the spindle axis perform an accelerated rotation at maximum capacity using a maximum permissible current of a drive source, from the process start position toward the target thread depth, with the maximum rotation speed set as a target value;
   execute a torque-limiting during a period when the spindle axis performs the accelerated rotation, in such a manner that, at a start of acceleration, a predetermined torque command lower than a maximum torque command provided for the accelerated rotation at maximum capacity is given to the spindle axis, and during a predetermined time elapsing from the start of acceleration, the predetermined torque command is gradually increased so that the maximum torque command is given to the spindle axis at an instant when the predetermined time has elapsed;
   detect a maximum acceleration of the spindle axis during the accelerated rotation at maximum capacity, based on the rotational position;
   detect a residual rotation amount of the spindle axis during a period when the spindle axis operates from a current position to the target thread depth, based on the total rotation amount and the rotational position;
   detect a current speed of the spindle axis based on the rotational position; and
   make the spindle axis perform a decelerated rotation at maximum deceleration corresponding to the maximum acceleration so as to reach the target thread depth, after the accelerated rotation at maximum capacity, based on the maximum acceleration, the residual rotation amount and the current speed;

wherein the synchronized operation of the spindle axis and feed axis are controlled by the controller.

2. The controller of claim 1, wherein the controller is configured to make the spindle axis reach the target thread depth, after the accelerated rotation at maximum capacity, based on the maximum acceleration, the residual rotation amount, the current speed and a predetermined acceleration-change time, by making the spindle axis perform a decelerated rotation at an acceleration lower than the maximum acceleration and changing at a predetermined rate during the acceleration-change time, while making the spindle axis perform the decelerated rotation at the maximum capacity deceleration during a time except for the acceleration-change time.

3. The controller of claim 1, wherein the controller is configured to obtain, from the tapping program, a total return-rotation amount and a maximum return-rotation speed of the spindle axis during a period when the spindle axis operates from the target thread depth to a return completion position, and to send the total return-rotation amount and the maximum return-rotation speed as the spindle-axis command;
wherein controller is configured to make the spindle axis perform an accelerated inverse rotation at maximum capacity using a maximum permissible current of a drive source, from the target thread depth, or from an initial return position at which the spindle axis has returned by a predetermined rotation number from the target thread depth, toward the return completion position, with the maximum return-rotation speed set as a target value;
wherein the controller-is configured to detect or obtain a maximum acceleration of inverse rotation during a period when the spindle axis performs the accelerated inverse rotation from the target thread depth;
wherein the controller is configured to detect a residual return-rotation amount of the spindle axis during a period when the spindle axis operates from a current position to the return completion position, based on the total return-rotation amount and the rotational position;
wherein the controller is configured to detect a current speed of inverse rotation of the spindle axis based on the rotational position; and
wherein the controller is configured to make the spindle axis perform a decelerated inverse rotation at an acceleration lower than the maximum acceleration of inverse rotation and changing at a predetermined rate during a predetermined acceleration-change time, and also perform a decelerated inverse rotation at maximum capacity deceleration corresponding to the maximum acceleration of inverse rotation during a time except for the acceleration-change time, so as to make the spindle axis stop at the return completion position, after the accelerated inverse rotation at maximum capacity, based on the maximum acceleration of inverse rotation, the residual return-rotation amount, the current speed of inverse rotation and the acceleration-change time.

4. The controller of claim 3, wherein the controller is configured to monitor the residual rotation amount and to judge that a tapping process reaches the target thread depth when the residual rotation amount becomes equal to or less than a first predetermined value;
wherein the controller is configured to make the spindle axis stop at the target thread depth;
wherein the controller is configured to make the spindle axis perform the accelerated inverse rotation at maximum capacity, from the target thread depth toward the return completion position, with the maximum return-rotation speed set as a target value;
wherein the controller is configured to execute a torque limiting during a period when the controller makes the spindle axis perform the accelerated inverse rotation, in such a manner that, at a start of acceleration, a predetermined torque command lower than a maximum torque command provided for the accelerated inverse rotation at maximum capacity is given to the spindle axis, and during a predetermined time elapsing from the start of acceleration, the predetermined torque command is gradually increased so that the maximum torque command is given to the spindle axis at an instant when the predetermined time has elapsed; and
wherein the controller is configured to detect the maximum acceleration of inverse rotation during the accelerated inverse rotation at maximum capacity, based on the rotational position.

5. The controller of claim 3, wherein the controller is configured to monitor the residual rotation amount and to judge that a tapping process reaches the target thread depth when the residual rotation amount becomes equal to or less than a first predetermined value;
not make the spindle axis stop at the target thread depth but to make the spindle axis perform an accelerated inverse rotation at the maximum acceleration of inverse rotation, which is identical to a maximum deceleration during the decelerated rotation at maximum capacity, to the initial return position, after the spindle axis reaches the target thread depth;
make the spindle axis perform the accelerated inverse rotation at maximum capacity, from the initial return position toward the return completion position, with the maximum return-rotation speed set as a target value; and
obtain the maximum deceleration in the decelerated rotation at maximum capacity as the maximum acceleration of inverse rotation.

6. The controller of claim 4, wherein the controller is configured to monitor the residual return-rotation amount and to judge that a return motion is completed when the residual return-rotation amount becomes equal to or less than a second predetermined value.

7. The controller of claim 1,
wherein the
controller configured to obtain, from the tapping program, a total feed amount and a thread pitch of the feed axis during a period when the feed axis operates from the process start position to the target thread depth, and to send the total feed amount and the thread pitch as the feed-axis command; and
wherein the:
controller is configured to control the feed motion of the feed axis, based on the thread pitch and the rotational position; and
wherein the controller is configured to detect a residual feed amount of the feed axis during a period when the feed axis operates from a current position to the target thread depth, based on the total feed amount and the feed position.

8. The controller of claim 7, wherein the controller is configured to recognize the current position of the spindle axis based on the residual rotation amount, and also recognize the current position of the feed axis based on the residual feed amount.

9. The controller of claim 7, wherein the controller is configured to calculate a synchronization error in the synchronized operation, based on the residual rotation amount, the residual feed amount and the thread pitch.

10. The controller of claim 3,
wherein the
controller is configured to obtain, from the tapping program, a total return-feed amount and a thread pitch of the feed axis during a period when the feed axis operates from the target thread depth to the return completion position, and to send the total return-feed amount and the thread pitch as the feed-axis command, when the controller judges that the tapping process reaches the target thread depth; and
wherein the
controller is configured to control a return-feed motion of the feed axis, based on the thread pitch and the rotational position; and
wherein the controller is configured to detect a residual return-feed amount of the feed axis during a period when the feed axis operates from a current position to the return completion position, based on the total return-feed amount and the feed position.

11. The controller of claim 10, wherein the controller is configured to recognize the current position of the spindle axis based on the residual return-rotation amount, and also recognize the current position of the feed axis based on the residual return-feed amount.

12. The controller of claim 10, wherein the controller is configured to calculate a synchronization error in the synchronized operation, based on the residual return-rotation amount, the residual return-feed amount and the thread pitch.

13. A controller of a machine tool, configured to control a synchronized operation of a spindle axis and a feed axis, the controller being configured to:
prepare a spindle-axis command and a feed-axis command based on a tapping program;
control a rotational motion of the spindle axis in accordance with the spindle-axis command;
detect a rotational position of the spindle axis; and
control a feed motion of the feed axis in accordance with the feed-axis command, based on the rotational position;
obtain, from the tapping program, a total return-rotation amount and a maximum return-rotation speed of the spindle axis during a period when the spindle axis operates from a target thread depth to a return completion position, and to send the total return-rotation amount and the maximum return-rotation speed as the spindle-axis command to the spindle-axis control section;
make the spindle axis perform an accelerated inverse rotation at maximum capacity using a maximum permissible current of a drive source, from the target thread depth, or from an initial return position at which the spindle axis has returned by a predetermined rotation number from the target thread depth, toward the return completion position, with the maximum return-rotation speed set as a target value;
detect or obtain a maximum acceleration of inverse rotation during a period when the spindle axis performs the accelerated inverse rotation from the target thread depth;
detect a residual return-rotation amount of the spindle axis during a period when the spindle axis operates from a current position to the return completion position, based on the total return-rotation amount and the rotational position;
detect a current speed of inverse rotation of the spindle axis based on the rotational position; and
make the spindle axis perform a decelerated inverse rotation at an acceleration lower than the maximum acceleration of inverse rotation and changing at a predetermined rate during a predetermined acceleration-change time, and also perform a decelerated inverse rotation at maximum capacity deceleration corresponding to the maximum acceleration of inverse rotation during a time except for the acceleration-change time, so as to make the spindle axis stop at the return completion position, after the accelerated inverse rotation at maximum capacity, based on the maximum acceleration of inverse rotation, the residual return-rotation amount, the current speed of inverse rotation and the acceleration-change time
wherein the synchronized operation of the spindle axis and feed axis are controlled by the controller.

14. A method of controlling a machine tool, configured to control a synchronized operation of a spindle axis and a feed axis, the method comprising the acts, executed by a controller, of:
obtaining, from a tapping program, a total rotation amount and a maximum rotation speed of the spindle axis during a period when the spindle axis operates from a process start position to a target thread depth;
making the spindle axis perform an accelerated rotation at maximum capacity using a maximum permissible current of a drive source, from the process start position toward the target thread depth, with the maximum rotation speed set as a target value, while executing a torque-limiting in such a manner that, at a start of acceleration, a predetermined torque command lower than a maximum torque command provided for the accelerated rotation at maximum capacity is given to the spindle axis, and during a predetermined time elapsing from the start of acceleration, the predetermined torque command is gradually increased so that the maximum torque command is given to the spindle axis at an instant when the predetermined time has elapsed;
detecting a maximum acceleration during the accelerated rotation at maximum capacity, based on a rotational position feedback of the spindle axis;
detecting a residual rotation amount of the spindle axis during a period when the spindle axis operates from a current position to the target thread depth, based on the total rotation amount and the rotational position feedback;
detecting a current speed of the spindle axis based on the rotational position feedback; and
making the spindle axis perform a decelerated rotation at maximum deceleration corresponding to the maximum acceleration so as to reach the target thread depth, after the accelerated rotation at maximum capacity, based on the maximum acceleration, the residual rotation amount and the current speed.

15. A method of controlling a machine tool, configured to control a synchronized operation of a spindle axis and a feed axis, the method comprising the acts, executed by a controller, of:
obtaining, from a tapping program, a total return-rotation amount and a maximum return-rotation speed of the spindle axis during a period when the spindle axis operates from a target thread depth to a return completion position;

making the spindle axis perform an accelerated inverse rotation at maximum capacity using a maximum permissible current of a drive source, from the target thread depth, or from an initial return position at which the spindle axis has returned by a predetermined rotation number from the target thread depth, toward the return completion position, with the maximum return-rotation speed set as a target value;

detecting or obtaining a maximum acceleration of inverse rotation during a period when the spindle axis performs the accelerated inverse rotation from the target thread depth;

detecting a residual return-rotation amount of the spindle axis during a period when the spindle axis operates from a current position to the return completion position, based on the total return-rotation amount and a rotational position feedback of the spindle axis;

detecting a current speed of inverse rotation of the spindle axis based on the rotational position feedback; and making the spindle axis perform a decelerated inverse rotation at an acceleration lower than the maximum acceleration of inverse rotation and changing at a predetermined rate during a predetermined acceleration-change time, and also perform a decelerated inverse rotation at maximum deceleration corresponding to the maximum acceleration of inverse rotation during a time except for the acceleration-change time, so as to make the spindle axis stop at the return completion position, after the accelerated inverse rotation at maximum capacity, based on the maximum acceleration of inverse rotation, the residual return-rotation amount, the current speed of inverse rotation and the acceleration-change time.

* * * * *